US012682376B2

(12) United States Patent
Edwards

(10) Patent No.: US 12,682,376 B2
(45) Date of Patent: *Jul. 14, 2026

(54) STATIC AND DYNAMIC NETWORK DEVICE AND SERVICE INVENTORIES AS A MECHANISM TO GENERATE PERSONALIZED AD PROFILES

(71) Applicant: Adeia Guides Inc., San Jose, CA (US)

(72) Inventor: Warren Keith Edwards, Atlanta, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/743,420

(22) Filed: Jun. 14, 2024

(65) Prior Publication Data

US 2025/0022011 A1 Jan. 16, 2025

Related U.S. Application Data

(63) Continuation of application No. 17/865,601, filed on Jul. 15, 2022, now Pat. No. 12,039,572.

(51) Int. Cl.
| | |
|---|---|
| *G06Q 30/00* | (2023.01) |
| *G06Q 30/0241* | (2023.01) |
| *G06Q 30/0251* | (2023.01) |
| *H04L 43/062* | (2022.01) |
| *H04L 67/306* | (2022.01) |

(52) U.S. Cl.
CPC ..... *G06Q 30/0271* (2013.01); *G06Q 30/0277* (2013.01); *H04L 43/062* (2013.01); *H04L 67/306* (2013.01)

(58) Field of Classification Search
CPC ........... G06Q 30/0271; G06Q 30/0277; G06Q 30/0201; G06Q 30/0269; H04L 43/062; H04L 67/306
See application file for complete search history.

(56) References Cited

U.S. PATENT DOCUMENTS

| | | |
|---|---|---|
| 12,039,572 B2 | 7/2024 | Edwards |
| 2006/0004627 A1 | 1/2006 | Baluja |

(Continued)

OTHER PUBLICATIONS

PCT Search Report PCT/US2023/027737,(mailed Sep. 28, 2023),(13 pages).

*Primary Examiner* — Meredith A Long
(74) *Attorney, Agent, or Firm* — HG LAW LLP

(57) ABSTRACT

Systems and methods are disclosed for a network inventory service (NIS). An NIS may, for example, profile a private network for personalized advertising by recording a list of devices connected to the private network, recording traffic data for the private network, and generating profile associated with the private network based on the recorded list of devices and the recorded traffic data. The NIS may be notified, e.g., of a device within the private network, an advertising avail, request, from an advertising service, a targeted advertisement based on the user profile, and cause the targeted advertisement to be inserted in the advertising avail. In some embodiments, an NIS may work in conjunction with an inventory profile service (IPS) and/or an ad presentation service (APS). An IPS may deliver rules for analyzing new devices and/or network traffic and an APS may communicate with the NIS along with various advertiser networks to supply personalized ads.

19 Claims, 11 Drawing Sheets

(56) References Cited

U.S. PATENT DOCUMENTS

| | | | |
|---|---|---|---|
| 2011/0055915 A1* | 3/2011 | Hall | H04L 67/52 |
| | | | 726/12 |
| 2013/0083805 A1 | 4/2013 | Lu et al. | |
| 2013/0107131 A1 | 5/2013 | Barnett et al. | |
| 2014/0046751 A1* | 2/2014 | Akbar | G06F 9/451 |
| | | | 705/14.39 |
| 2014/0157309 A1 | 6/2014 | Small et al. | |
| 2016/0260135 A1* | 9/2016 | Zomet | H04L 67/535 |
| 2018/0324050 A1 | 11/2018 | Smith et al. | |
| 2019/0213638 A1* | 7/2019 | Hurewitz | G06Q 30/0269 |
| 2019/0222901 A1 | 7/2019 | Fennelly | |
| 2022/0215435 A1 | 7/2022 | Sueda | |
| 2024/0020732 A1 | 1/2024 | Edwards | |

* cited by examiner

210

| Device Key 212 (MAC Address) | IP Address 214 | Name 216 | Description 218 | OS 220 | First seen 222 | Last seen 224 |
|---|---|---|---|---|---|---|
| 00:00:5e:00:53:af | 192.168.1.1 | Bob's Mac | Apple Mac | macOS 12.1 | 2021-10-31 12:47:49 | N/A |
| 00:1b:44:11:3a:b7 | 192.168.1.2 | iphone6 | Apple iPhone | iOS 15.2 | 2020-09-15 17:52:30 | 2021-11-27 13:45:20 |
| 2c:54:91:88:c9:33 | 192.168.1.255 | Twowire.home | U-verse gateway | Linux 2.4.18 | 2019-04-16 08:31:45 | N/A |

230

| Device Key 232 (MAC Address) | Port 234 | Status 236 | Protocol 238 | Subprotocol 240 |
|---|---|---|---|---|
| 00:1b:44:11:3a:b7 | 80 | Open | TCP | HTTP |
| 00:1b:44:11:3a:b7 | 443 | Open | TCP | HTTPS |
| 00:1b:44:11:3a:b7 | 4567 | Open | UDP | Unknown |

250

| Flow ID 251 | Source (MAC or IP) 252 | Destination (MAC or IP) 254 | Service Category 256 | Service Characterization 258 | Sub-Categorization 260 | Started 262 | Ended 264 | MB/S 266 | Latency 268 | Loss 270 |
|---|---|---|---|---|---|---|---|---|---|---|
| 2792 | 52.3.10.11 | 00:00:5e:00:53:af | Streaming Video | Netflix | Stranger Things S2E3 | 2021-11-27 14:40:02 | Current | 13.2 | 8ms | 8% |
| 2973 | 00:00:5e:00:53:af | 00:1b:44:11:3a:b7 | Messaging | iMessage | N/A | 2021-11-28 15:53:10 | 2021-11-28 15:53:45 | 0.2 | 2ms | 0% |
| 2974 | 00:1b:44:11:3a:b7 | 43.129.23.233 | Gaming | Steam | League of Legends | 2021-11-28 11:35:52 | Current | 5.2 | 7ms | 7% |

| Flow ID | Source (MAC or IP) | Destination (MAC or IP) | Service Category | Service Character-ization | Sub-categor-ization | Started | Ended | MB/S | Laten-cy | Loss |
|---|---|---|---|---|---|---|---|---|---|---|
| 2849 | 52.3.10.11 | 00:00:5e:00:53.af | Streaming Video | HBO Max | Game of Thrones S2E3 | 4/27/22 17:10 | Current | 14.3 | 8ms | 8% |
| 2713 | 52.3.10.11 | 00:00:5e:00:53.af | Streaming Video | Prime Video | The Marvelous Mrs. Maisel S1E7 | 4/27/22 13:44 | 4/27/22 14:32 | 12.1 | 10ms | 6% |

Figure 3B:
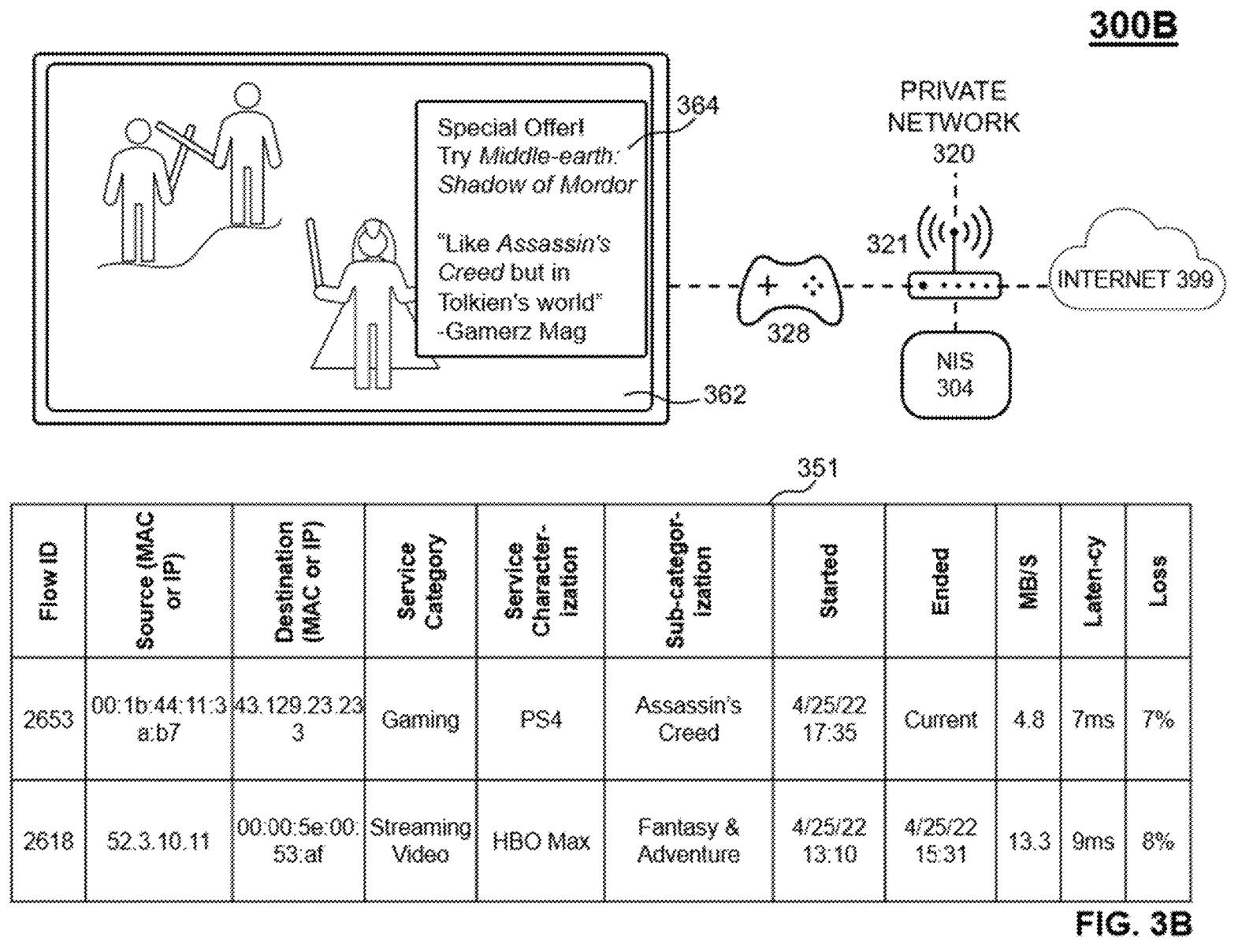

300B

INTERNET 399

PRIVATE NETWORK 320

321

NIS 304

328

364

362

Special Offer!
Try *Middle-earth:*
*Shadow of Mordor*

"Like Assassin's
Creed but in
Tolkien's world"
-Gamerz Mag

351

| Flow ID | Source (MAC or IP) | Destination (MAC or IP) | Service Category | Service Character-ization | Sub-categor-ization | Started | Ended | MB/S | Laten-cy | Loss |
|---|---|---|---|---|---|---|---|---|---|---|
| 2653 | 00:1b:44:11:3 a:b7 | 43.129.23.23 3 | Gaming | PS4 | Assassin's Creed | 4/25/22 17:35 | Current | 4.8 | 7ms | 7% |
| 2618 | 52.3.10.11 | 00:00:5e:00: 53:af | Streaming Video | HBO Max | Fantasy & Adventure | 4/25/22 13:10 | 4/25/22 15:31 | 13.3 | 9ms | 8% |

STATIC AND DYNAMIC NETWORK DEVICE AND SERVICE INVENTORIES AS A MECHANISM TO GENERATE PERSONALIZED AD PROFILES

CROSS-REFERENCE TO RELATED APPLICATION

This application is a continuation of U.S. patent application Ser. No. 17/865,601, filed Jul. 15, 2022, the disclosure of which is hereby incorporated by reference herein in its entirety.

BACKGROUND

The present disclosure relates to monitoring private networks, and more particularly to systems and related processes for generating advertising profiles based on static device data and dynamic traffic data in a private network.

SUMMARY

Accessing content generally involves accessing multiple networks that are, e.g., public or private. Digital advertising typically relies on tracking content consumed on public networks such as the worldwide web. While tracking addresses, browsers, and digital "fingerprints" via public networks may have evolved over the years, identifying device activity on private networks has been limited. Private networks in various environments such as home, work, travelling, etc. generally have security that prevents outside entities from capturing data flowing inside a private network. For example, a media access control address (MAC address) is a unique identifier assigned to a network-enabled device that is typically inaccessible to devices outside the network. Certain security software, e.g., in browsers, can even obscure trackable data from outsiders' view. Device data and activity data of a private network, such as a home network, may be incredibly valuable to potential digital advertisers. Private network data can help reveal which one of the several devices in a home using a single IP address is actually accessing a given website, service, or content item. Without examining the private network traffic, it can be difficult to determine which particular user and which particular device is accessing a website, content item, or service. Private network data may also reveal devices and network activity that may be using one or more third-party platforms like Ring® cameras, Apple® HomeKit®, or Sonos® wireless speakers. There exists a need to create more precise advertising profiles based on recording device data and private network traffic. Tracking private network data may sound worrisome, but a Network Inventory Service (NIS) platform can be implemented on a private network device, e.g., transparently and securely.

An abundance of home-network-connected devices such as computers, televisions, smartphones, tablets, remote controls, speakers, virtual assistant devices, and more, as well as digital transmission of media content, has increased the amount of content consumed, as well as the ways for content to be consumed inside a household, office, and/or institution. The development of household devices and connectivity among such devices have also increased the number of techniques and quantity of data that can be transmitted to and from various devices. For example, internet of things ("IoT") devices may be able to communicate over a network, as well. It has become more difficult to identify or infer devices accessing content based on public network data due to the incredible number of network-enabled devices available to each household.

Generally, such internet-connected personal devices do not connect directly to the internet as, for example, each device typically connects to a private network, e.g., a local area network (LAN) using Wi-Fi and/or ethernet, which is connected to an internet service provider (ISP) to allow web access. A "smart home" may include, for instance, various network-connected televisions, monitors, phones, watches, remote controls, voice-controlled speakers, streaming media players, cameras, security devices, lights, fans, thermometers, thermostats, vacuums, scales, health monitors, and more, e.g., connected to one or more network routers as a hub. Such smart devices may communicate with each other and servers outside the network in many ways, but typically network devices send and receive traffic via the router(s). Device data and traffic data within a private network may be valuable for creating and updating highly detailed user profiles and categories used for personalized advertising.

Personalized or "targeted" advertising is a primary economic engine of the modern internet. In some advertising approaches, advertising networks—in conjunction with websites and other online destinations—collect information about users and develop user profiles. These profiles may include demographic information, but also may include information about users' interests and social networks, as well as user behaviors, collected by the networks as users visit and interact with a variety of websites. From these profiles, ad networks may segment users into a variety of categories and/or classifications to be made available to advertisers. These advertisers may, in turn, pay ad networks to display their ads to users deemed to be within their preferred targeted segments and/or categories. When an advertising opportunity (e.g., an "avail") arises for a user with a profile the fits an advertiser's desired target audience, the avail may be sold for an ad placement. Generally, the narrower the targeted segment desired by the advertiser is, the more successful the advertisement is expected to be and, thus, the more expensive the advertising opportunity will be. Such user profiles are generally built and updated based on data collected during web browsing and other interactions with internet-connected devices and applications. With a more detailed user profile, the user will see and enjoy advertisements with products and services better tailored to his or her demographics, interests, and/or behaviors. Moreover, by matching highly detailed profiles with narrowly targeted desired audiences, ad networks can enjoy more advertising success and charge a premium. Advertising sales models are dependent upon how well entities can track user devices to develop more comprehensive user profiles.

While web tracking has existed in one form or another for decades, systems outside of a private network generally cannot scan a private network to identify every device operating on the network. Such systems cannot reliably track services and activity on a per-device level for the private network. As a result, even if it is advantageous to act on per-device information, external systems have typically been precluded from doing so. Said another way, external systems typically struggle to develop a holistic picture of the devices and traffic activity on a private network. Systems, such as ad networks or ISPs, cannot usually identify all devices on the private network, identify device types for each device, and/or identify services operating on each device, etc. While some internet users may take solace in the fact that profilers may continue to fail to generate a holistic picture of a user, many current approaches to track users on public and private networks tend to be invasive, unsafe, and surreptitious.

Approaches to web tracking may generally take a few forms. Three of the most common forms are internet protocol (IP) address tracking, cookie tracking, and fingerprint tracking. For instance, an ISP may assign an IP address to a home or office where all devices may register at the same external IP address. Tracking "cookies" generally can be a tool for websites to track activities of web browser applications of various users. Digital "fingerprinting" may typically attempt to infer a device identity in order to track a device based on data like model name (e.g., "iPhone® 13"), display size, browser app, app versions, extensions, browsing history, etc. Profiles may be developed based on inferences from one or more of such tracking methods, as well as by combining data from other sources such as user accounts, surveys, location data, and more.

IP address tracking enables interested parties to track activity associated with a public IP address. Every device connected to the internet is assigned an IP address. With appropriate software on the host website, the IP address of visitors to a site can be logged and used to determine the visitor's geographical location, for example. However, public IP addresses are a limited resource. As a result, an ISP typically assigns a single public IP address to a home. This single IP address is assigned to a router or gateway, which assigns local IP addresses to all connected devices at the home and manages connections between these devices and the internet. This function of mapping multiple local private addresses to a single public IP address is called Network Address Translation (NAT). From the perspective of devices on the "outside" of the gateway and NAT, all devices on the home network share the same public IP address. As a result, while an external device can monitor and log web activity associated with a public IP address, the external device cannot use IP address tracking alone to reliably track activity on a per-device level.

Considering the apparent weaknesses of IP address tracking, many platforms utilize tracking cookies to monitor web activity. Cookies may enable per-browser tracking. A cookie is typically a small block of information created by a website and embedded onto a user's device by the website when the user visits the website. In a typical example, when a user visits a website for the first time, the user's browser requests a page from the website. In response, the website creates a cookie with a unique ID. Then, the website transmits this cookie to the user's browser along with the requested web page. From that point forward, every time the user visits the website, the user's browser transmits the cookie to the website. The website can then monitor the user's activity (e.g., queries, pages visited, dates/times visited, purchases, interactions with ads, etc.), create a log of this activity, and store the log such that it is linked to the unique ID for the cookie. As noted, cookies are per-browser. As a result, if a user utilizes two different browsers on her desktop, a website may associate a first cookie with the first browser and a second cookie with the second browser. Likewise, when an application accesses a website, a third or fourth cookie may be generated separately. Cookie tracking alone may not reliably enable per-device tracking of devices on a private network. A tracking system based on cookies would need to rely on additional information to infer that each of browser and/or application is tied to the same user and/or same device.

A third web-tracking approach is called fingerprinting. As with cookies, fingerprinting tends to enable per-browser tracking. In a typical fingerprinting example, information is collected about the software and hardware of a remote computing device for the purpose of identification. The information is usually assimilated into a brief identifier using a fingerprinting algorithm. Information used to build a browser fingerprint includes browser version, browser extensions, device model (e.g., iPhone model), operating system version, display size or aspect ratio, browsing history, etc. To the extent fingerprinting enables per-device tracking, devices must be inferred based on various characteristics associated with a user's browser session. These inferences are not always accurate or precise.

Notably, while each device on a private network has a MAC address, MAC addresses are typically not made available outside the gateway. Further, as privacy concerns have gained traction over recent years, some browsers and extensions have introduced fingerprint defense mechanisms (e.g., by limiting the precision and/or amount of data that will be shared with external systems). Moreover, even if fingerprint blocking were not an issue, fingerprinting cannot be used to track traffic existing exclusive devices and traffic on the private network.

In some approaches, platforms can collect platform-specific data that originates from a device on a private network. However, each platform is typically only aware of activity relating to that platform. For instance, Ring devices may report data collected by the devices to Amazon®; Apple Homekit devices may report data collected by HomeKit devices to Apple; and Sonos wireless speakers may collect and report devices and/or content used by their speakers. This collected data is typically not accessible to other parties and, in some cases, may be considered proprietary. That is, typically, a Ring device cannot scan an entire private network to detect all devices, device types, services, and traffic on the network. A wide variety of other user behaviors, which might be invaluable for targeted advertising, exists beyond the scope of each of these platforms, as it occurs inside the private home network and is thus not "visible" via the public websites and servers that integrate with the ad networks. Platform owners, such as Apple, Google, and others, sell devices into the home that may perform some level of data collection about network activity, e.g., within each ecosystem. An Apple TV device, for instance, will act as a HomeKit hub when deployed, discovering and aggregating information about other HomeKit-compatible devices on the network. Generally, data about such devices and how they are used could be used by each platform owner to profile the users in the home. Such approaches, however, only collect data about devices and usage within that platform-specific ecosystem and are generally only available to the platform owner. This not only limits the level of profiling that can be performed, but also limits opportunities to leverage larger ad networks beyond those of the platform owner. Even an Amazon Echo® device configured to adjust a Google Nest thermostat, turn on Philips® Hue light bulbs, open a myQ®-connected garage door, and play music on a Bose® SoundLink may not have access to a full picture of the devices and traffic in a private network. These platforms are not able to capture a holistic picture of the devices and activity on the private network, much less detect opportunities for the insertion of personalized ads.

As residential network-enabled and/or IoT devices proliferate, they increasingly have the potential to generate a deeply personalized profile of household residents and how they live their lives. Not only can the types of devices in the home paint a picture of household residents (e.g., age, socio-economic status, number of people, level of technological sophistication, how they spend their free time), but also the traffic between these devices can provide insights (e.g., daily routines, what services they subscribe to, how much television they watch, whether they are gamers, and so forth). As more and more of users' lives becomes guided by these devices, the devices increasingly represent a highly personalized and detailed picture of how we live our lives. Currently, however, much of this rich trove of data is either completely inaccessible, or, at best, only accessible to proprietary, vertical platform owners.

In some approaches, much traffic within the home network never traverses the network gateway and, instead, it is locked behind a NAT (Network Address Translation) service and other protocols that make data inaccessible from outside the network. In some cases, devices that are behind the home NAT gateway are not discoverable from outside the network, meaning that no external entity can scan the home network to produce an inventory of devices inside. In some approaches, a specific "slice" of the interior of the home network may be visible to certain platform owners. For example, telemetry from Google Home™ and such devices may report to Google servers about their activities, and Apple Homekit devices may self-discover and report an inventory of HomeKit-compatible devices to Apple. Other platforms, such as Vizio®, may capture data about programming viewed on their smart televisions, and use this data to generate personalized profiles used for advertising. These platform-specific entry points into the home network do not capture or incorporate data outside their proprietary ecosystems. The above-listed challenges denote that, currently, holistic data about home network usage is extremely difficult to capture, and thus unavailable for a variety of uses, including targeted advertising based on network usage and activity.

Generally, many approaches fail to address at least one of three challenges. First, any solution must be able to generate a holistic, platform-independent picture of the home network-including the devices that are on the network and a characterization of the traffic on the network-despite the fact that these devices and much of the traffic are not accessible from outside the home network itself. Secondly, given that there is significant "churn" in the state of the art of IoT devices, many approaches fail to be extensible, in the sense of being able to accurately detect and report new types of devices and new services as they come online. Thirdly, current approaches are typically not able to serve highly personalized advertising based on the individual profiles of home occupants. Typically, these ads may be presented in a variety of ways and on a variety of platforms based on extrapolated family demographics and social media profiles, but these approaches are still guessing which users are using which devices. For example, no approaches offer a solution able to both integrate with existing ad platforms such as those by Google® or Facebook® and also offer opportunities for new types of ad presentation.

In some approaches, ISPs often track network activity. All traffic between a gateway and the internet is routed through an ISP. As a result, an ISP may monitor unencrypted traffic between private network devices and the internet. For example, an ISP typically can detect websites visited and, when the connections to the websites are not secure/encrypted, communications with the websites (e.g., online searches, email conversations, social media activity, etc.). An ISP, however, does not have access to the MAC addresses or private IP addresses of the devices on the private network associated with these activities. Thus, while an ISP might detect, e.g., a Spotify® session or Netflix® stream, an ISP might struggle to determine that the originating devices are, e.g., an iPhone and/or a Roku® device, in any given situation. Further, in some approaches, even if an ISP can detect device types or operating systems associated with certain traffic, the ISP cannot necessarily detect traffic that remains local behind the NAT, nor can an ISP scan the private network to identify devices on the private network that never communicate over the internet. As noted, external systems typically cannot scan a private network (e.g., a home network) to detect devices operating on the private network. While each device on a private network has a MAC address, MAC addresses are not included with traffic data between the gateway and the internet. Moreover, while each device on the private network typically has a local IP address, these local IP addresses are not observable by devices outside the private network. Further, most private networks implement firewalls that block inbound connections that might be used to scan the private network for hosts and services.

As a result, in approaches to scan a private network for devices and services, a device typically needs to be on the private network. Moreover, some traffic on a private network never leaves the private network. External systems have no means for gaining awareness of this traffic or of acting on such traffic. For example, the gateway that connects the private network to the internet can often detect devices, device types, services, and traffic on the private network. The gateway may make this information available via the internet to external devices via the internet, where the information can be analyzed and displayed (e.g., via a web interface); however, typical gateways do not build user profiles or glean insights about demographics or interests of users on the network. For example, while some approaches using gateways may detect device types (e.g., iPhones, Android devices, Windows PC, etc.) or analyze traffic to detect services or websites on the network (e.g., Netflix, Zoom®, Apple Music, etc.), these gateways typically do not analyze this information to develop profiles indicating interests or demographics. Moreover, typical gateways do not monitor traffic to identify opportunities to inject advertisements. Further, some traffic never traverses the gateway or leaves the private network. For example, a mobile device might cause a Wi-Fi printer to print a document or webpage, but this traffic would not leave the private network. External systems have no way to identify this activity or to act on such information.

In some approaches a private network inventory (e.g., home network gateways) may be built. However, such approaches generally do not build user profiles based on private network inventories, let alone utilize such profiles to detect opportunities to inject personalized ads. By tracking and analyzing private network activity on a per-device basis, the disclosed system enables more fine-grained user profiles than previously possible. Moreover, the disclosed system enables in-home advertisement injection from within the private network based on a real-time holistic picture of what is happening on the private network.

As described herein, there are several concepts relating to monitoring devices, services, and traffic on a private network behind a Network Address Translation device (e.g., a home gateway). Generally, the system first analyzes devices, services, and traffic on a private network to build a profile of one or more users on the private network. Second, the system monitors the private network, from within the private network, to detect opportunities to inject personalized advertisements tailored to the profiles. In some instances, the advertisement may be tailored not only to the user's interest (e.g., Bob is a gamer), but also to real-time or recent network activity (e.g., Bob is playing, or recently played, a game on X-Box). The system may then insert the personalized advertisements, e.g., from within the private network.

As described herein, there may be three primary components: (1) a Network Inventory Service (NIS), implemented at a device on the private network, which generates an inventory of the private network based on rules for identifying services and devices; (2) an Inventory Profile Service (IPS), which supplies the NIS with rules; and (3) an Ad Presentation Service (APS), implemented at a device on the private network, which detects opportunities for targeted ads and causes the presentation of targeted ads.

Generally, embodiments may include an NIS device installed inside the home network, which creates an inventory of both the static and dynamic state of the network. For instance, the NIS device may capture and record data regarding the devices on the home network as well as the traffic usage within the home network. This inventory may be used to create a detailed profile of household users, such as what devices they own, what they are doing, and so forth, which can then be used as the basis for segmented advertising, potentially in combination with other profile data based on user accounts, social media, browsing habits, sales records, etc. Because this NIS device analyzes network traffic data in real time or near real time (referred to as the dynamic state of the network), ads can potentially be served based on real-time (or near real-time) activity of users—not just pre-computed profiles. This dynamic data creates an opportunity for in-the-moment presentation of ads, e.g., potentially based on various sets of criteria for segmenting.

For example, the NIS may determine that a user has an interest in improving Wi-Fi performance, e.g., based on an analysis of network equipment, network performance, etc. Subsequently, the NIS may be notified that an advertising opportunity (e.g., avail) to target this interest may be detected. For example, it may be detected that a set-top box (STB) device on a private network is suffering from a poor Wi-Fi connection while streaming Netflix or another streaming platform. In response to being notified of an advertising opportunity, the NIS may communicate with an ad service, e.g., an APS, to deliver a personalized ad and cause the user's STB (or some other device, such as a smartphone) to present an ad to purchase a new mesh Wi-Fi system. Generally, the NIS may cause presentation of personalized ads in typical advertising avails and commercial spots. There may be various places available for an advertisement insertion, such as at a pause or commercial break, a banner ad, a picture-in-picture window, a pop-up, an overlay, an interstitial ad spot, a pre-roll avail, a clickable link, and more. For example, audio and/or video ads personalized using data from an NIS may be inserted in and/or over an existing stream, e.g., to replace less personalized ads. In some embodiments, a web ad, personalized using data from an NIS, may be inserted into/onto a webpage the user is viewing from a web browser, e.g., instead of a non-targeted ad. In some embodiments, a personalized ad, pre-downloaded from an APS or ad service, may be inserted from within the private network. For example, a targeted commercial may be loaded ahead of the NIS identifying a triggering event, such a slow network traffic.

According to some embodiments, since much of this data is currently "locked" in the home (e.g., behind NAT gateways, making in inaccessible from outside the network), an NIS has the potential to form an entirely new set of profile data that reveals aspects of personal behavior that are not directly accessible to other means of profiling. Further, an NIS may incorporate aspects that provide it with (i) extensibility to recognize and integrate new types of devices and services, deployed in a home (or other private network) in the future, and (ii) a flexible mechanism for ad presentation, e.g., allowing the insertion of ads into a variety of contexts within the home network.

Additionally, a NIS may monitor the dynamic traffic on the local network, and based on this traffic, identify which service may be associated with which particular traffic. Generally, any device on a home network can only receive traffic intended specifically for it. For instance, each network frame contains a destination MAC address, and when the device's network interface receives a frame, it drops the network frame unless the destination MAC matches that of the network interface. However, by enabling a "promiscuous mode" on a device's network interface, all network frames may be passed, allowing the device to read frames intended for other devices. Using, e.g., a combination of data describing source and/or destination IP address, protocol types, port numbers, and (potentially) lower-level traffic analysis, an overall categorization of network traffic data may can be performed.

In some embodiments, e.g., embodiments in a home network setting, such traffic monitoring generally works well. Although ethernet and IEEE 802.11x networks can typically only monitor traffic in the same broadcast domain, this is not usually a problem for most home networks, as they have a relatively simple topology. More sophisticated home networks, e.g., with switching or multiple subnets, may benefit from implementing an NIS for each broadcast domain to capture traffic in that portion of the network. Alternatively, configuring an NIS to run on (or in conjunction with) the home gateway would allow it to monitor all traffic that routes either within its broadcast domain or to the public internet.

Generally, accessing and analyzing private network data may trigger security concerns. Some embodiments may use a transparent mechanism for users to give permission to implement a NIS platform and maintaining anonymity to advertisers. For example, private network users (e.g., families) may allow an NIS component to be implemented at a device on the private network, e.g., as part of a home network device such as a wireless router, modem, hub, a digital video recorder (DVR), a cable/streaming set-top box (STB), or more. The NIS may generate an inventory of the private network based on received rules for identifying services and devices, and highly personalized advertisements may be delivered to devices on a private network, e.g., while maintaining anonymity of the private network devices outside the NIS platform. Families may opt in to allow data to be captured and stored securely. In some embodiments, a service may contract with the family to allow the NIS to monitor traffic, e.g., as part of a premium network service. In some embodiments, interactive permission agreements may be sent to each device as the device logs on to the network for the first time (or renews a connection every few days, weeks, months, etc.). An NIS platform, configured to allow private network monitoring, can be implemented in a transparent and safe way.

A second component of this invention may be an Inventory Profile Service (IPS). Some embodiments may utilize an external IPS server to supply the NIS with updated rules useful for identifying the ever-growing range of home network devices and services. The NIS may be extensible to identify new types of IoT devices and new types of traffic data (e.g., after the NIS has been deployed into the home). Notably, this type of extensibility addresses a particular challenge in the space of IoT because new devices are being produced all the time and because new service offerings are common. Without some mechanism for extensibility, the NIS might only be able to inventory devices and services known at the time of its development. The IPS may facilitate the extensibility and adaptability of the NIS. Generally, in some embodiments, the IPS may be a cloud-based service, e.g., residing outside the home, which may supply a variety of device and/or service identification rules to the NIS. These rules may be processed by the NIS to allow identification of new device types and new traffic patterns as they appear on the private network (e.g., a home network). Such a rule set may be an open-ended set of rules to provide extensibility in the face of an ever-evolving IoT ecosystem.

A third component may be an Ad Presentation Service (APS), which communicates with the NIS along with various advertiser networks to supply personalized ads on the basis of the home network inventory. The APS would run on one or more client devices within the home network, and present ads in a range of formats, depending on its capabilities and location in the network. Advantageously, rather than presenting personalized ads purely in a web-based format, the disclosed systems may present ads by way of devices in the home using a wide variety of media types.

An NIS platform, potentially working with an IPS, may provide a unique way of delivering personalized ads using an APS, which may present ads through streaming video, audio, or traditional web-based ads injected into media streams within the home network. As disclosed herein, the NIS may leverage a network inventory—a real-time capture of device types and device traffic within the home network—that can be used to generate profiles of home residents, which can then be used to serve personalized ads. This inventory may consist of both a static network state—e.g., a set of devices present on the network, which may change relatively rarely—as well as a dynamic state of the network—, e.g., the real-time traffic patterns of usage of devices and services on the network.

In some embodiments, one or more components of an NIS, an IPS, and an APS may comprise a trained model. For instance, an IPS may utilize machine learning to develop rules to categorize and/or cluster device data and/or traffic data for a private network. In some embodiments, an NIS may comprise a trained model, e.g., delivered and/or updated by the IPS, to (i) develop profiles for users, devices, traffic, etc. and (ii) determine one or more attributes for the profiles, e.g., based in demographics, interests, behaviors, and/or other attributes. In some embodiments, an NIS may comprise a trained model to identify advertising avails and/or match profiles with target audiences for advertisements.

In some embodiments disclosed herein, an NIS may profile a private network for personalized advertising by, e.g., recording a list of devices connected to the private network, recording traffic data for the private network, and generating profile(s) associated with the private network based on the recorded list of devices and the recorded traffic data. The NIS may (i) detect, e.g., from a device within the private network, an advertising avail; (ii) request, from an advertising service, a targeted advertisement based on the user profile; and (iii) cause the targeted advertisement to be inserted in the advertising avail.

In some embodiments, the NIS may generate a user profile further by, e.g., (i) accessing a profiling rule from the IPS; (ii) determining (based on the profiling rule, a recorded list of devices, and/or the recorded traffic data) an attribute selected from at least one of the following: a demographic, an interest, or a behavior; and (iv) updating, by the NIS device, the user profile based on the determined attribute.

In some embodiments, the NIS may record a list of devices connected to the private network by, e.g., monitoring one or more of the following: private IP address, MAC address, port status, active services, operating system, hardware properties, software properties, etc. In some embodiments, the NIS may record traffic data on the private network by, e.g., monitoring one or more of the following: destination address for packets, data speed, Wi-Fi link quality, traffic between devices on the network, and traffic between local devices and external devices.

In some embodiments, the NIS may generate a user profile associated with the private network based on the recorded list of devices and the recorded traffic data. In some embodiments, the NIS generates a household profile based on private network traffic/devices/services. In some embodiments the NIS may develop a plurality of individual user profiles. In some embodiments, the NIS may generate a user profile based, at least in part, on distinct services operating on distinct devices (e.g., Spotify on mobile, Netflix on a Roku). In some embodiments, the NIS may generate a user profile based, at least in part, on, e.g., use of device type, use of services, and web traffic.

In some embodiments, the NIS may detect an advertising avail by, e.g., detecting user interest in a content genre based on the user profile. Requesting the targeted advertisement may comprise requesting the targeted advertisement related to the content genre corresponding to the detected user interest. In some embodiments, the NIS may detect an advertising avail based, at least in part, on network performance or Wi-Fi performance.

In some embodiments, the NIS may request, from an advertising service outside the private network, a targeted advertisement based on the user profile by, e.g., selecting the targeted advertisement. The targeted advertisement may be selected based on data describing current content consumption. In an embodiment, the data describing current content consumption describes: content metadata, content source, content consumption device, user viewer history, user device history, or some combination thereof.

In some embodiments, the NIS may cause a targeted advertisement to be inserted in the advertising avail by, e.g., causing the targeted advertisement to be placed one or more of the following avails: an interstitial avail, a banner avail, a picture-in-picture avail, an overlay avail, a pre-roll avail, a commercial break, and a clickable link.

In some embodiments, the NIS may generate a user profile comprising: age, socioeconomic status, education level, technology experience, user interests, gender, other users of the private network, or some combination thereof.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 depicts illustrative data structures for static data and dynamic data of a private network, in accordance with some embodiments of the disclosure;

FIG. 3B depicts an illustrative interface for providing personalized advertisements based on static and dynamic data of a private network, in accordance with some embodiments of the disclosure;

DETAILED DESCRIPTION

Devices may be designed to facilitate content consumption. Content like video, animation, music, audiobooks, ebooks, playlists, podcasts, images, slideshows, games, text, and other media may be consumed by users at any time, as well as nearly in any place. Abilities of devices to provide content to a content consumer are often enhanced with the utilization of advanced hardware with increased memory and fast processors in devices. Devices—e.g., computers, telephones, smartphones, tablets, smartwatches, microphones (e.g., with virtual assistants), activity trackers, e-readers, voice-controlled devices, servers, televisions, digital content systems, video game consoles, security systems, cameras, hubs, routers, modems, and other internet-enabled appliances—can provide and/or deliver content almost instantly.

The household devices may generally be any network-connected devices in a home or an environment near one or more media-viewing locations, such as a house, apartment/condo building, office, dormitory, hotel, school, community living arrangement, or other location. The network-connected devices may be internet of things ("IoT") devices which are capable of communicating between the devices and a controller such as a virtual assistant platform, for example, Google Home, Apple Homepod, Amazon Echo, as well as other home assistants and/or hubs. Such household devices and controllers may share some functions and may be able to communicate with content delivery devices via one or more networks.

Generally, a private network may refer to any network where the device and/or traffic information is private. For instance, a private network may refer to a network behind an NAT and, e.g., shares an outside IP address. A Network Inventory Service (NIS) may refer to a service implemented at a device on the private network, which generates an inventory of the private network based on rules for identifying services and devices. An Inventory Profile Service (IPS) may refer to a service which supplies the NIS with rules. An Ad Presentation Service (APS) may refer to a service implemented at a device on the private network, which, e.g., detects opportunities for targeted ads and causes the presentation of targeted ads. Advertising avails may refer to advertising opportunities, which may be identified opportunities within content available to an advertiser or advertising service to sell so that, e.g., a targeted advertisement may be delivered and inserted in the avail. For instance, the NIS and/or APS may be notified of an advertising opportunity, e.g., on a device on the private network or the NIS may create a new opportunity for the APS, e.g., based on an event that triggers a rule for a targeted advertisement.

Figure 1A:
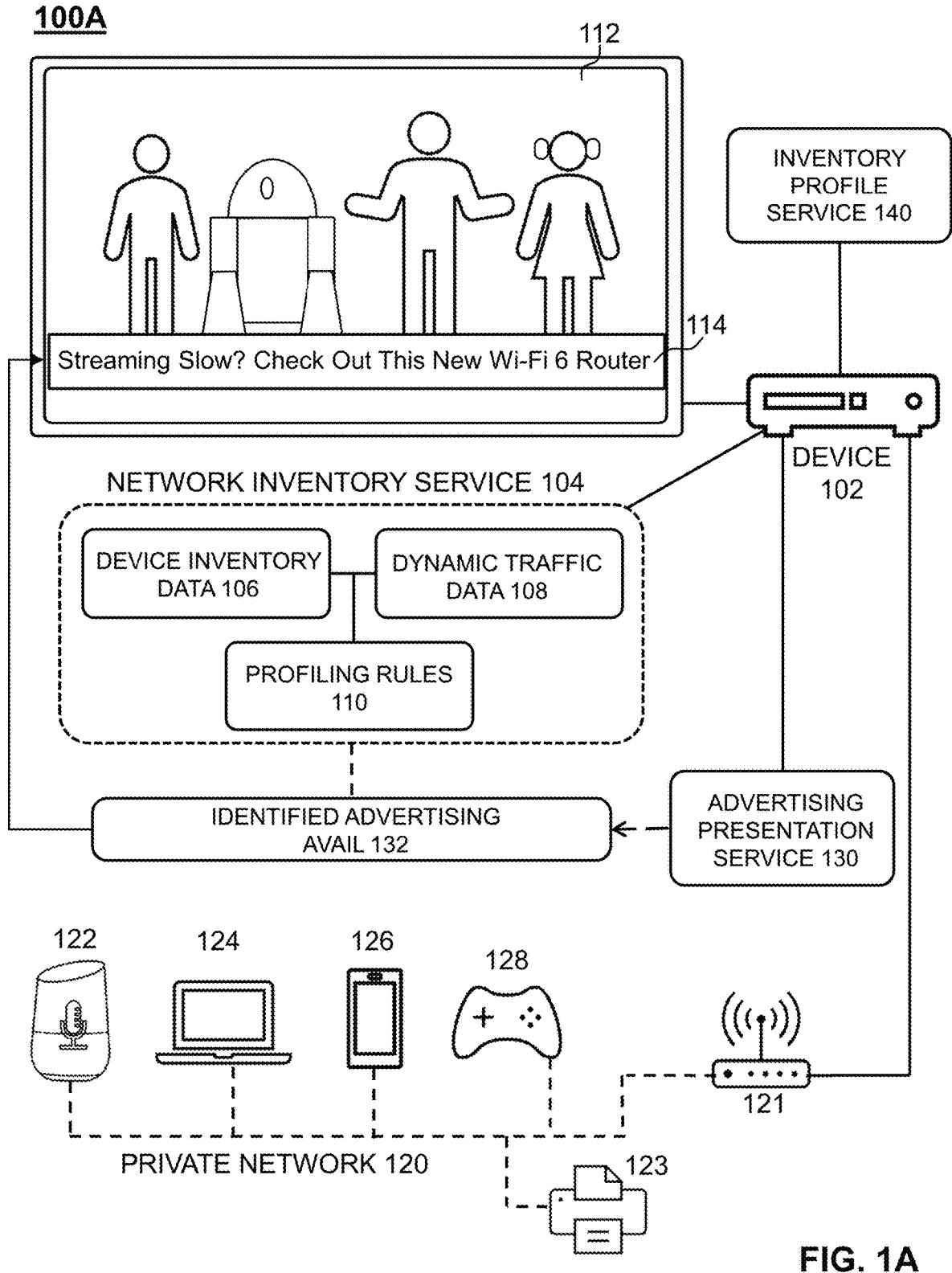
FIG. 1A depicts an illustrative profiling system based on static and dynamic data of a private network, in accordance with some embodiments of the disclosure.

FIG. 1A depicts an illustrative profiling system based on static and dynamic data of a private network, in accordance with some embodiments of the disclosure. Scenario 100A generally depicts Network Inventory Service 104 working in conjunction with IPS 140 to profile private network 120 using device inventory data 106 and dynamic traffic data 108, in view of profiling rules 110 to identify an advertising avail 132 with APS 130 and deliver ad overlay 114 in interface 112. Private network 120 comprises router 121, printer 123, gaming device 128, phone 126, laptop 124, and speaker 122, as well as device 102. In some embodiments, such as scenario 100A, NIS 104 and APS 130 may be run on, e.g., a media device 102 (such as a DVR or STB) and an advertisement may be presented within interface 112 as overlay 114 atop the video. For instance, a profiling segment that delivers this ad may be "identify homes with Disney+ streaming currently on the streaming device that are experiencing packet loss above 25%" with an ad overlay placed by, e.g., NETGEAR® for their Orbi™ mesh network router.

In some embodiments, first, NIS 104 is run on a device internal to the home network. In such embodiment, the NIS is thus located within the network topology in such a way that it has access to devices and traffic that are strictly internal to the network (e.g., including traffic that remains entirely within the home network and does not cross the NAT boundary). This service can be run on any programmable client device within the network. In some embodiments, an NIS may be implemented in a STB-type device 102 or streaming device, as an application on a traditional laptop 124 or desktop PC, or to the home gateway (e.g., device 121) itself. In some embodiments, an NIS may be deployed as a software update. At startup time, and periodically thereafter, NIS 104 may generate an inventory of the devices on the home network, e.g., device inventory data 106.

A device inventory, such as device inventory data 106, may be produced through use of a variety of protocols intended to discover and identify devices on the local network. These include, but are not limited to, ZeroConf, Bonjour, Simple Service Discovery Protocol (SSDP), Link Layer Discovery Protocol (LLDP), and others. Such protocols generally work at a variety of layers of a network stack, but together may provide a snapshot of the device population on the network, in terms of, e.g., physical addresses, network-layer addresses, manufacturer identity, device type, operating system version, and which services are currently running on it.

In some embodiments, a device inventory is relatively static, as it changes relatively infrequently, so the scan can be performed at a frequency of minutes or even longer intervals. Additionally, NIS 104 monitors the dynamic traffic data 108 on the private network, and based on this traffic, may identify which service(s) the traffic is associated with. Normally, any device on the home network can only receive traffic intended specifically for it, as each network frame contains a destination MAC address, and when the device's network interface receives a frame, it drops it unless the destination MAC matches that of the network interface. However, by configuring a setting, e.g., a so-called "promiscuous mode," on a device's network interface, all network frames may be passed, allowing the device to read frames intended for other devices.

Through a combination of source/destination IP address, protocol type, port number, and potentially lower-level traffic analysis, an overall categorization of network traffic can be performed. In some embodiments, such as those in home network settings and/or with simple topology, traffic monitoring may generally work very well. More sophisticated home networks—e.g., with switching or multiple subnets—may often require an NIS for each broadcast domain in order to capture traffic in that portion of the network. In some embodiments, running the NIS on the home gateway would allow it to monitor all traffic that routes either within its broadcast domain or to the public internet. As new devices are discovered on the home network, and as traffic analysis indicates the use of a particular service, these details are added to an inventory database (e.g., inventory database 105 of FIG. 1B), which may reside directly on the NIS device or in the cloud.

Generally, NIS 104 will use device inventory 106 and dynamic traffic data 108 in view of profiling rules 110 to determine, e.g., demographics, interests, behaviors, etc., that may be matched with target audience attributes. In some embodiments, inventory profile service 140 (IPS) may be a cloud-based service (e.g., residing outside the home network), which may supply a variety of device/service identification rules to NIS 104. Profiling rules 110 are received and processed by the NIS to allow it to identify specific new device types, and new traffic patterns, as they appear on the home network. This can be a potentially open-ended set of rules that provide extensibility in the face of an ever-evolving IoT ecosystem.

At startup time, and periodically thereafter, NIS 104 may establish a secure connection with IPS 140 and download an updated set of profiling rules 110 that allow it to profile/identify network devices and traffic. Profiling rules 110 might adopt a variety of forms. For example, rules might be written as a set of declarative predicates, e.g., simple code statements, based on a set of underlying primitive tests, that return a Boolean value of either true or false, which can often be chained together. In some embodiments, profiling rules 110 may incorporate a trained model to identify, categorize, and/or cluster device inventory data 106 and/or dynamic traffic data 108. New profiling rules 110 may be delivered from the IPS down to the NIS as new device types become discovered and/or supported by the system.

By way of one nonlimiting example, a particular device may be recognized as an HP LaserJet using a predicate language in which an overall test may be comprised of several subtests and Boolean connectors. For instance: ("HP LaserJet"? ((port IPP open) OR (port LPR open)) AND (snmp vendor "HP") AND (snmp make "LaserJet")). In this case, the output of the predicate (e.g., "Is the device an HP LaserJet?") would be true if and only if either the IPP or LPR ports (e.g., two common port numbers used by printers) are open (e.g., available for connection by clients) and if a probe by the Simple Network Management Protocol (SNMP) reports that the device identifies its vendor as "HP" and its make as "LaserJet." Further tests, such as the port and SNMP test shown here, can extend the expressive power of such an approach.

Further, since predicates can be chained, higher-level inferences may be made using additional predicates. By way of another nonlimiting example, a predicate that determines if a household should be categorized as "gamers" might be based on lower-level predicates that determine if certain device types or service usage exists within the home: (gamer? (device Xbox exists) OR (device Playstation5 exists) OR (service Steam exists)). This predicate, for example, would report true to the query of whether the home is a gamer household based on whether either a video game console device exists in the home or, e.g., usage of a gaming service such as Steam has been observed.

As new identification rules are downloaded by the NIS, they may execute, e.g., each time a device scan is performed, or a new traffic flow is detected, to extend the analysis capabilities of the NIS. Any of these embodiments of extensibility could be used effectively.

Some embodiments may incorporate open-source tools such as Nmap and may use fingerprinting as a means to identify devices. Nmap, for instance, uses a variety of low-level network probes, such as analyzing TCP/IP sequence numbers used by a device, how ICMP packets are echoed to a sender, how the IP ID field is generated, and so forth, to create a so-called "subject fingerprint" of a target device of unknown type. This subject fingerprint is then compared to a database of "reference fingerprints" that characterize the response of known types of devices to these low-level probes. These fingerprints are represented using a compact format by Nmap.

This approach provides a highly accurate means of identifying specific devices, as long as a reference fingerprint for the device exists. In such embodiments, IPS 140 may serve as a repository of reference fingerprints, delivering reference fingerprints to NIS 104. Further, using the Nmap model it may be further possible to write higher level rules to perform device and protocol analysis based on the results of fingerprinting. Nmap provides a scripting language called NSF that may be used to deliver scripts that analyze the network environment to identify, e.g., new device(s) and traffic types. Some embodiments may rely on, e.g., a powerful fingerprinting model provided by Nmap, coupled with the high-level extensibility provide by scripting or predicate functions.

A third component is Ad Presentation Service (APS) 130, which may communicate with NIS 104 along with various advertiser networks to supply personalized ads on the basis of the home network inventory. APS 130 may run on one or more client devices within the home network, and present ads in a range of formats, depending on its capabilities and location in the network. In some embodiments, the APS may be run on the same device as the NIS, meaning that a single client deployed in the home can provide both services. For instance, in scenario 100A, APS 130 and NIS 104 run on device 102. In some embodiments, APS 130 and NIS 104 run on separate devices. In some embodiments, rather than only presenting personalized ads purely in a web-based format, ads in a wider variety of media types may be presented by devices in the home.

Generally, the NIS and APS may use typical advertising avails or generate a new advertising avail. For instance, the NIS and/or APS may be notified of an advertising opportunity, e.g., on a device on the private network or the NIS may create a new opportunity for the APS, e.g., based on an event that triggers a rule for a targeted advertisement. In some embodiments, the APS may be notified of a typical ad avail and recognize this traditional advertising avail as an opportunity to insert a highly personalized advertisement, e.g., based on the private network data recorded by the NIS. In some embodiments, the APS may be notified of an event (e.g., beginning of streaming, a network slowdown, etc.) and recognize the event as an opportunity to place a highly personalized advertisement based on the collected private network data. For example, a rule may be in place that when a categorized binge-watcher is streaming video on the private network, and they experience packet loss above 25%, a quick banner and/or overlay offering a new router may be presented, e.g., during playback and/or pause. Notifications of ad avails for ad placement may be performed in various way. For instance, devices and applications may be configured to request ads from and/or through the APS rather than directly with an ad server. In some embodiments, the NIS and/or APS may intercept requests to ad servers and request more personalized ads, e.g., based on the private network data. In some embodiments, an ad server may recognize a request a device on the private network (e.g., using IP address, cookies, and/or fingerprinting) and request more user information, e.g., from the corresponding NIS, etc.

A variety of embodiments may exist for the APS, depending on where it is run. For example, the APS may be run on an STB or streaming device. In such an embodiment, the APS may interject interstitial video ads (e.g., replacing existing video ads, embedding ads in a video stream as picture-in-picture, presenting overlays, etc.) as ads are supplied from one or more advertising networks, e.g., based on the profile generated from the home network inventory and traffic data. Such an embodiment might also interject an overlay (e.g., chyron) or clickable link or other form of ad presentation. In some embodiments, where the APS is run on a streaming music player, audio-based advertisements may be presented. If an APS is run on the home gateway, the APS may be able to interject HTML-based advertisements into pages supplied to web browsers within the home network.

In some embodiments, such as scenario 100A, where APS 130 may be run on the same device as NIS 104, a single client may be deployed on the private network to, e.g., provide both services. For example, a DVR, STB, or streaming-type device could perform both network scanning and ad presentation in the same device. This combination of in-home and external components may provide an architecture in which unique network-based profiles can be created and updated in real time, e.g., depending on network activity in the home. Such profiles can, in turn, be used to define audience segmentations similar to those used in conventional online ad marketplaces but based on personalized user data not currently available to those networks. The exact format of the developed profile data may depend on which ad network is connected to the system, e.g., for compatibility of matching profiles with target audience attributes.

Some embodiments may utilize one or more of first-party ad networks (e.g., in which the company deploying the NIS platform also supplies its own advertising network) and connection to existing third-party advertising networks, such as Facebook Ads or others. For example, a first-party ad network may collect data from NIS devices across many homes. Based on a clustering analysis of these (such as based on a K-means analysis), the first-party ad network may allow advertisers to segment their audiences in a number of ways, based on either static data or dynamic properties of the home network (including real-time or near-real-time data). Generally, a first-party advertising network may aggregate data across all of its users and generate categorical clusters of users based on observed behavioral attributes to allow segmenting based on life events, interests, household composition, and similar attributes. In some embodiments, an ad network based around this invention may offer a similar set of such attributes based on, e.g., usage of a private network. For example, static properties offered as segment attributes might include:

User type: gamers, streamers, smart home addicts, Apple families, etc.

Household composition: single person, roommates, small family (e.g., extrapolated from number of devices)

Favorite ecosystem/platform: Google, Microsoft, Facebook, Apple, Amazon (e.g., determined from analysis of common service-type usage)

Categories of households with a specific make/model of device (e.g., NETGEAR Orbi 2021 model).

Dynamic properties offered as segment attributes by, e.g., an advertising network utilizing an NIS might include:

Specific categories of service usage: Netflix users, Apple TV+users, Disney+users, Amazon Music users Level of service usage: non-stop music household, TV addicts, late-night gamers, etc.

Attributes based on real-time dynamic properties of the network: people watching Netflix right now, people experiencing Wi-Fi problems right now, people hitting their bandwidth limit right now, people with multiple video streams in process right now, etc.

In some embodiments, in a first-party ad network, a number of audience segments could be offered to advertisers. Some embodiments may feature, e.g., audience segmenting based on the presence of specific device types in the home. For example, Ecobee, an Apple-friendly home automation supplier, may wish to target households with an Apple TV and existing Nest thermostats, on the basis that Apple customers may desire better HomeKit compatibility than is possible with the Nest ecosystem.

Some embodiments may feature, e.g., audience segmenting based on content analysis of traffic flows to identify specific content streams, even when those content streams are on a competitor's platform. For instance, Amazon Prime Video may desire to target households watching "Game of Thrones" on HBO Max to suggest they watch "Wheel of Time," a new fantasy series that may appeal to "Game of Thrones" viewers.

Some embodiments may feature, e.g., segmenting based on network traffic analysis to identify specific games in use, across platforms. For example, perhaps Monolith/WB Gaming has created a new game, "Shadow of Mordor," which has similar play mechanics to competitor Ubisoft's "Assassin's Creed." The developers may want to target these players for ads for Shadow of Mordor, but likely do not know the identities of these players since they are on a competitor's platform.

Some embodiments may feature, e.g., audience segmenting based on fine-grained identification of device types. For instance, NETGEAR may wish to identify households that have large numbers of Wi-Fi 6-compatible client devices, but which have not yet upgraded their access points to this latest technology. As noted earlier, one important characteristic of this invention is the potential for real-time targeting, based on current user activity.

Some embodiments may allow for ad targeting based on low-level traffic analysis and real-time profiling. As the NIS may be configured to capture and characterize network activity whenever a new traffic flow is detected, there is a potential for ads to be presented to users based on the activity they are performing, as they are performing it. For example, NETGEAR may wish to identify homes having poor Netflix performance as they are streaming and watching Netflix videos. Segmenting in this case may be, e.g., targeting users with currently active Netflix streams who are also experiencing high levels of packet loss on that flow, e.g., as evidenced by protocol retransmissions captured by the dynamic flow monitoring. Such a segment could be used to present suggestions for products that would improve the Netflix experience, potentially displayed as a chyron overlay and/or in-video ad, e.g., while the user is watching Netflix. For example, as ad may say "Having trouble watching Netflix right now? A Netgear Orbi would fix that!" or "Streaming Slow? Check Out This New Wi-Fi 6 Router" as shown in overlay 114 of scenario 100A.

For ad placement based on real-time aspects of network performance and usage, efficiency of matching from available ad inventory is essential: a specific observed condition (e.g., Netflix playing right now while experiencing packet loss above a threshold, e.g., 25%) may exist only for a short period. Thus, there needs to be a means for rapid connection of ad inventory targeting this particular segment with the home in which it is occurring. Some embodiments may address this efficiency need by using ad inventory targeting this segment to be "preplaced" at the ad network so that it is ready to be served when the particular condition arises. A wide variety of such real-time-based segments may be ready to be served at any given moment, based on a variety of network attributes (e.g., service in use, network quality, new device suddenly appears on the network, and so forth). Based on the aggregate set of network attributes used to place such ads, the ad network may transmit to the collection of NIS devices across multiple homes a "solicitation" of interest in certain network attributes. In effect, this may be a notification that the ad network wishes to be informed immediately when a certain condition arises in real time or near real time on the home network, such as Netflix streaming beginning.

Once this solicitation has been received by an NIS, it sets a trigger such that when the condition occurs in the inventory database, a notification is sent to the ad network, informing the ad network that the condition has arisen. This would in turn cause delivery of the ad to the home and placement via the APS. Such embodiments may provide an efficiency, in that the ad networks themselves do not have to constantly poll for changes in the home network status, across many homes. In some embodiments, these segments may be combined with other sources in order to extend them to profile attributes beyond those captured by network inventories. For example, by geolocating a home router, the NIS may infer the physical location of the home, and thus advertisers can utilize this in their audience segmenting based on, e.g., demographics and geographics.

Further, in some embodiments, when combined with an existing third-party ad network, that network's profile data can also be used to augment the inventory-based profiles. For example, the NIS may be manufactured and/or managed by a social network platform. If the NIS requires the user to be logged into the social network platform using their network account, then the captured network inventory profile attributes could be combined with existing social media profile attributes for that user.

Some embodiments may use connections of social media profiles with, e.g., geolocation or existing ecosystems data to increase the power of the profiles but may also connect personally identifiable information to the otherwise anonymous network profile. Such embodiments have transparent disclosure of such data being used and/or proper security to minimize transfer of identifying data beyond what is necessary to match ad profiles with audient attributes.

Figure 1B:
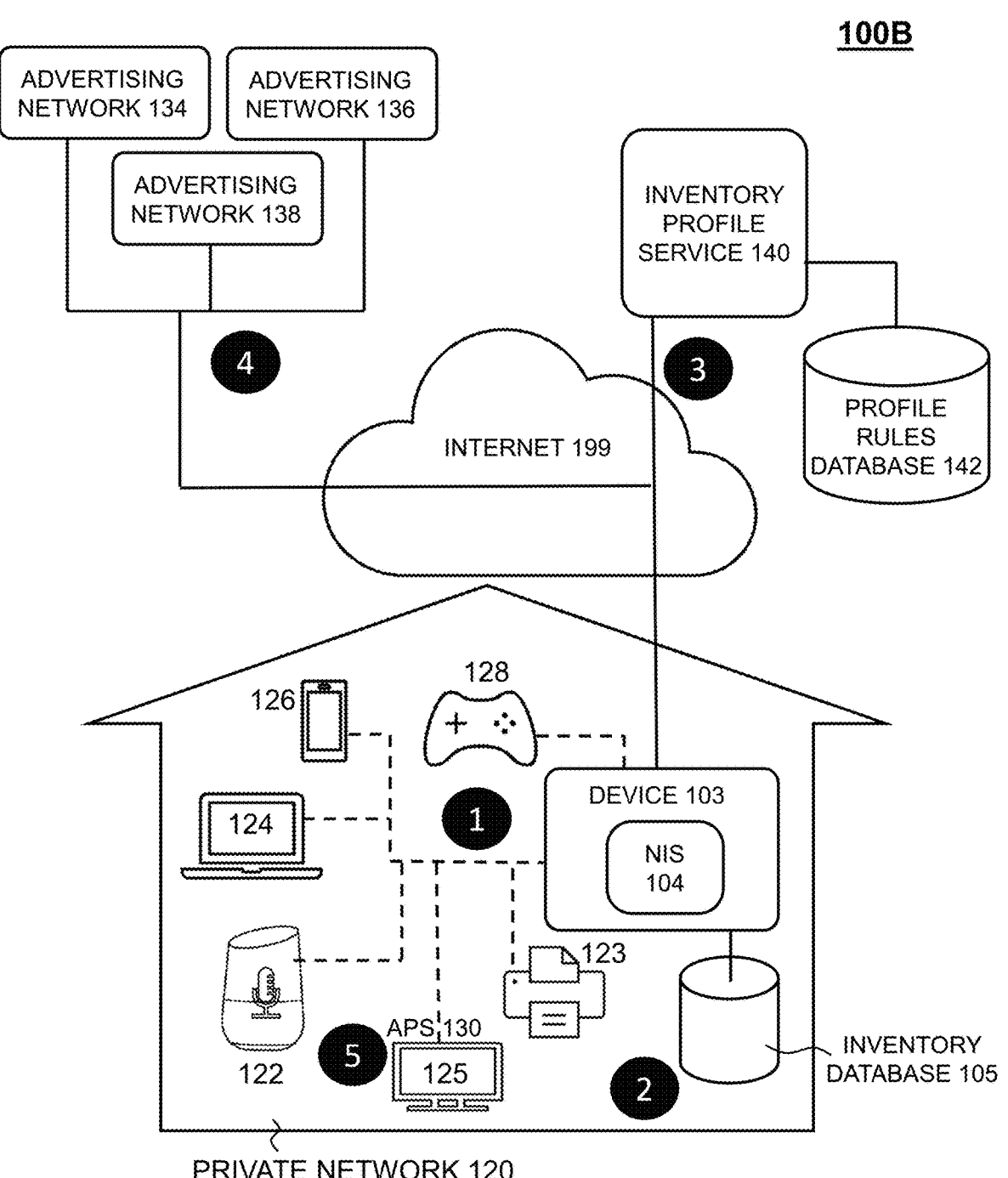
FIG. 1B depicts an illustrative profiling system based on static and dynamic data of a private network, in accordance with some embodiments of the disclosure.

FIG. 1B depicts an illustrative profiling system based on static and dynamic data of a private network, in accordance with some embodiments of the disclosure. Scenario 100B, for instance, depicts Network Inventory Service 104 working in conjunction with IPS 140 to profile private network 120 using device inventory data and dynamic traffic data 108, in view of profiling rules 110 to identify an advertising avail 132 with APS 130 and deliver ad overlay 114 in interface 112. Private network 120 comprises router 121, printer 123, gaming device 128, phone 126, laptop 124, and speaker 122, as well as device 102. In some embodiments, such as scenario 100A, NIS 104 and APS 130 may be run on separate devices and an advertisement may be presented by APS 130 on e.g., device 125. In some embodiments, such as scenario 100B, NIS 104 is installed in the home with a local inventory database, and IPS 140, as well as several ad networks 134, 136, and 138, are accessible through the cloud, e.g., internet 199. In some embodiments, such as scenario 100B, APS 130 may be executed on a device within the home network, e.g., a streaming device and/or television 125. NIS 104 may be part of a device on home network 120 and/or part of a home gateway, e.g., device 103.

At step 1, NIS 104 may scan the interior of the home network 120, e.g., recording a static inventory of the devices in the home. NIS 104 may also begin monitoring the dynamic traffic flows in the home network 120 and perform Nmap-style protocol analysis on these flows. Periodically, NIS 104 updates the static device inventory, to account for the addition or removal of devices. At step 2, both the static device inventory data and the dynamic flow data, tagged with the results of protocol analysis, are written to the inventory database 105.

At step 3, NIS 104 may establish a secure communication with the inventory profile service 140 to update its protocol analysis rules. These rules are stored in a profile rules database 142 associated with the IPS 140. In some embodiments, profile rules may be written in code or scripts, e.g., an Nmap-based implementation might consist of short scripts written in the Nmap scripting engine language (NSE). Rules from IPS 140 and profile rules database 142 may be integrated into NIS 104's protocol analysis steps so that it can be extensible to identify new types of devices or new types of traffic flows. Step 3 may be performed periodically and, e.g., relatively infrequently.

At step 4, NIS 104 communicates data to one or more advertising networks 134, 136, 138. These advertising networks 134, 136, 138 may be first-party networks (e.g., run by the company deploying the NIS platform) or third-party networks (e.g., existing ad suppliers). The NIS data is then used to create a segmented audience to which advertisers can deliver ads. In some embodiments, the data may be scrubbed of identifying information and/or revealing only private network attributes that match a desired audience. Ads may then be delivered via the network into the home, where they are presented via the Ad Presentation Service, depending on its capabilities (e.g., interstitial ads via a streaming device, injected HTML ads on a laptop computer or if the APS is run on the home gateway).

FIG. 2 depicts illustrative data structures for static data and dynamic data of a private network, in accordance with some embodiments of the disclosure. By way of non-limiting examples, table 210 and table 230 depict examples of possible schema for an inventory database, e.g., regarding a static device inventory. Table 210 itemizes the devices currently on the home network (e.g., keyed by MAC address), while table 230 enumerates the set of ports currently open on these devices.

Table 250 depicts a catalog of traffic data. Depending on the level of granularity required, a variety of schemas may be used to record dynamic flow data. In general, though, an advantageous data representation will collect aggregate data that summarizes traffic flows as service descriptions, tagged or labeled based on protocol analysis, and perhaps augmented with additional information such as packet loss or other performance characteristics. An exemplary schema for dynamic service usage is depicted in table 250. In table 250, each row indicates a service either in current use or recently seen, keyed by a unique ID. The Source 252 and Destination 254 columns represent the sending and receiving devices, identified via MAC address device keys for devices inside the home network, and public IP addresses for outside hosts.

The Service Category 256, Service Characterization 258, and Service Sub-categorization 260 columns may, e.g., identify a service type at varying levels of granularity. The Started 262 and Ended 264 columns may indicate the timestamp when the service was (or is currently) in use. The other columns may provide some aggregate details about overall performance and network utilization. Importantly, this database is updated in real time (or near real time) as new traffic flows are detected and analyzed. This means that the service usage database captures an in-the-moment description of user activity in the home. For example, when a user begins watching a program on Netflix, or playing a game on an Xbox®, or streaming Amazon Music to an Echo, this activity may be recorded as it occurs. As noted below, this level of fidelity may provide new opportunities for highly relevant ad presentation that are not possible via traditional profiling methods.

Note that some common devices (such as iOS devices, e.g., using iOS 14 or later) may provide users with an option to set a "private" MAC address. When set, this option generates a random MAC address for the device, potentially as often as every 24 hours. This option is intended to prevent tracking of the user's device, although it does interfere with a number of services that depend on a stable MAC address, such as Wi-Fi authentication. To cope with changing, randomized MAC addresses, an extension of this invention can instead rely on other, more stable, information about the device; such stable data can be returned as a part of the Nmap process, for instance, including the device's name. In the case of iOS devices, as one example, the device's name is rarely if ever changed and defaults to the user's name with the device type, such as "Bob's iPhone." Thus, a further database table could be provided that maps from the device name (e.g., stable) as a key to the randomized, unstable MAC address that is currently in use for that device; this MAC address could then be used as above to identify flows and devices.

Figure 3A:
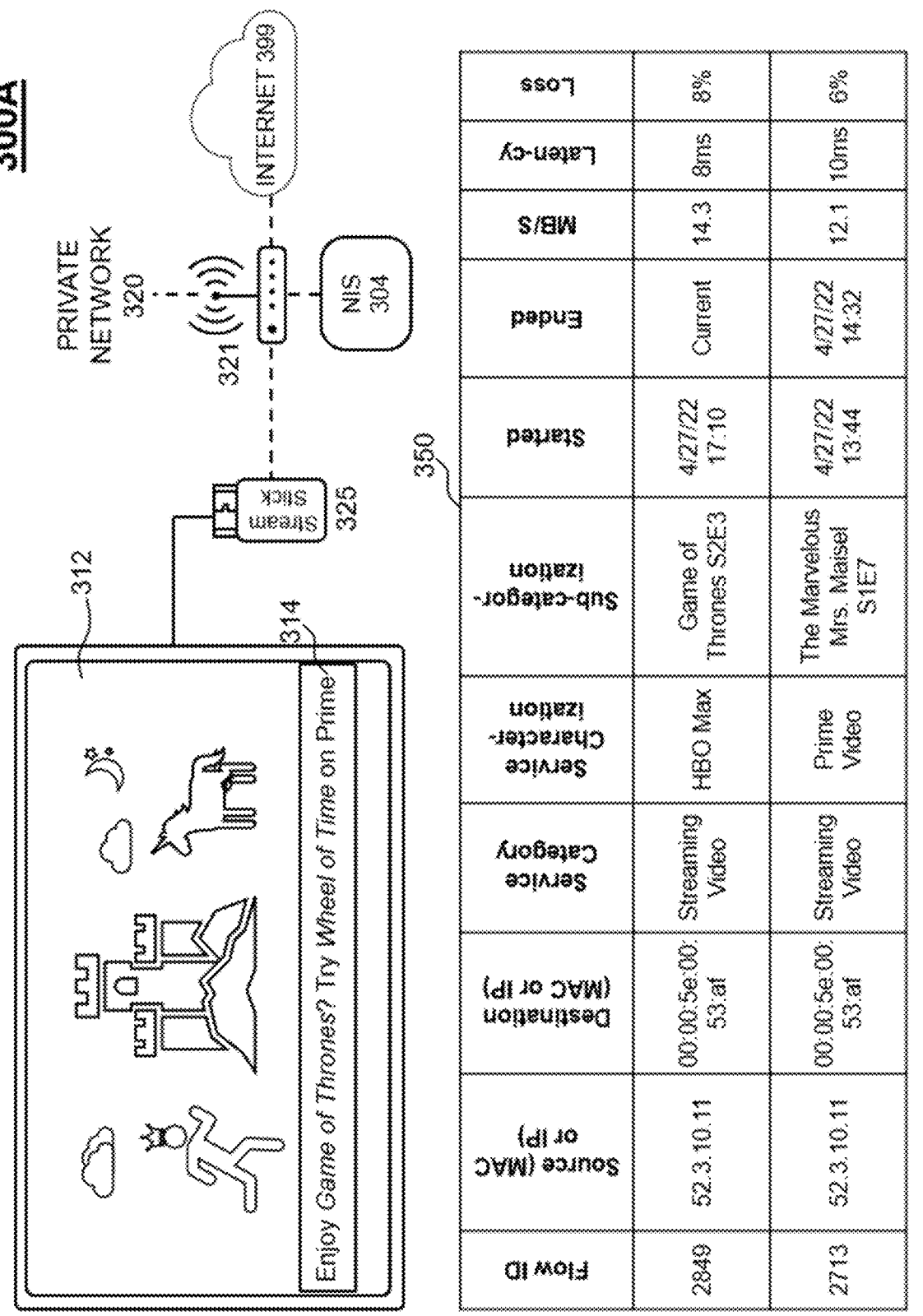
FIG. 3A depicts an illustrative interface for providing personalized advertisements based on static and dynamic data of a private network, in accordance with some embodiments of the disclosure.

FIG. 3A depicts an illustrative interface for providing personalized advertisements based on static and dynamic data of a private network, in accordance with some embodiments of the disclosure. Scenario 300A of FIG. 3A, for instance, depicts NIS 304 on a private network 320 with router 321 and streaming device 325.

Some embodiments, such as NIS 304 of scenario 300A, may feature, e.g., audience segmenting based on content analysis of traffic flows to identify specific content streams, even when those content streams are on a competitor's platform. For instance, Amazon Prime Video may desire to target households watching "Game of Thrones" on HBO Max to suggest they watch "Wheel of Time," a new fantasy series that may appeal to "Game of Thrones" viewers. An entry from database 350, recorded by NIS 304, identifies that "Game of Thrones S2E3" is currently being streamed via HBO Max via streaming device 325. As a result, in scenario 300A, advertisement overlay 314, saying, "Enjoy Game of Thrones? Try Wheel of Time on Prime" is presented via interface 312. In some embodiments, NIS 304 may work in conjunction with streaming device 325 to identify the advertising avail, such as an opportunity to present an overlay within a stream at a particular time, e.g., during scene transitions, during a slow scene, and/or during trick play (e.g., pause, fast-forward) commands. In some embodiments, an advertising presentation service may be incorporated in streaming device 325 and work in conjunction with NIS 304 to identify avails. In some embodiments, another NIS component may be incorporated in streaming device 325 and work in conjunction with NIS 304.

In some embodiments, multiple data points may be useful for a targeted attribute. For instance, in scenario 300A, database entry 350 also identifies that "The Marvelous Mrs. Maisel S1E7" was streamed from Prime Video, e.g., indicating that the viewer also subscribes to Prime. A streaming service may desire targeting, e.g., fans of "Game of Thrones" who already subscribe to their service in order to, e.g., encourage viewing of many programs and subscription renewals. In some embodiments, NIS 304 may use a trained model to cluster and/or categorize device and/or flow data for profiling and/or attribute discovery.

FIG. 3B depicts an illustrative interface for providing personalized advertisements based on static and dynamic data of a private network, in accordance with some embodiments of the disclosure. Scenario 300B of FIG. 3B, for instance, depicts NIS 304 on a private network 320 with router 321 and gaming device 328.

Some embodiments, such as NIS 304 of scenario 300B, may feature, e.g., audience segmenting based on network traffic analysis to identify specific games in use, across platforms. For example, perhaps Monolith/WB Gaming has created a new game, "Shadow of Mordor," which has similar play mechanics to competitor Ubisoft's "Assassin's Creed." The developers may want to target these players for ads for "Shadow of Mordor," but likely do not know the identities of these players since they are on a competitor's platform. An entry from database 351, recorded by NIS 304, identifies that "Assassin's Creed" is currently being played via gaming device 328, PS4. As a result, in scenario 300B, advertisement overlay 364, saying, "Special Offer! Try Middle-earth: Shadow of Mordor . . . 'Like Assassin's Creed but in Tolkien's world'-Gamerz Mag" is presented via interface 362.

In some embodiments, NIS 304 may work in conjunction with gaming device 328 to identify the advertising avail such as an opportunity to present an overlay within gameplay, e.g., during a loading screen, a scene transition, and/or during a pause. In some embodiments, an advertising presentation service may be incorporated in gaming device 328 and work in conjunction with NIS 304 to identify avails. In some embodiments, another NIS component may be incorporated in gaming device 328 and work in conjunction with NIS 304.

In some embodiments, multiple data points may be used for a targeted attribute. For instance, in scenario 300B, database entry 351 also identifies that a "Fantasy & Adventure" program was streamed from HBO Max, e.g., indicating that the viewer also enjoys fantasy genre content. A video game distributor may desire targeting, e.g., fans of "Assassin's Creed" who also enjoy fantasy genre content. Some users may already subscribe to the distributor and/or advertiser's service and such targeting may be used in order to, e.g., encourage game access and/or purchases by people who enjoy the fantasy genre and likely familiar with the works of the author J. R. R. Tolkien. In some embodiments, NIS 304 may use a trained model to cluster and/or categorize device and/or flow data for profiling and/or attribute discovery.

Figure 4:
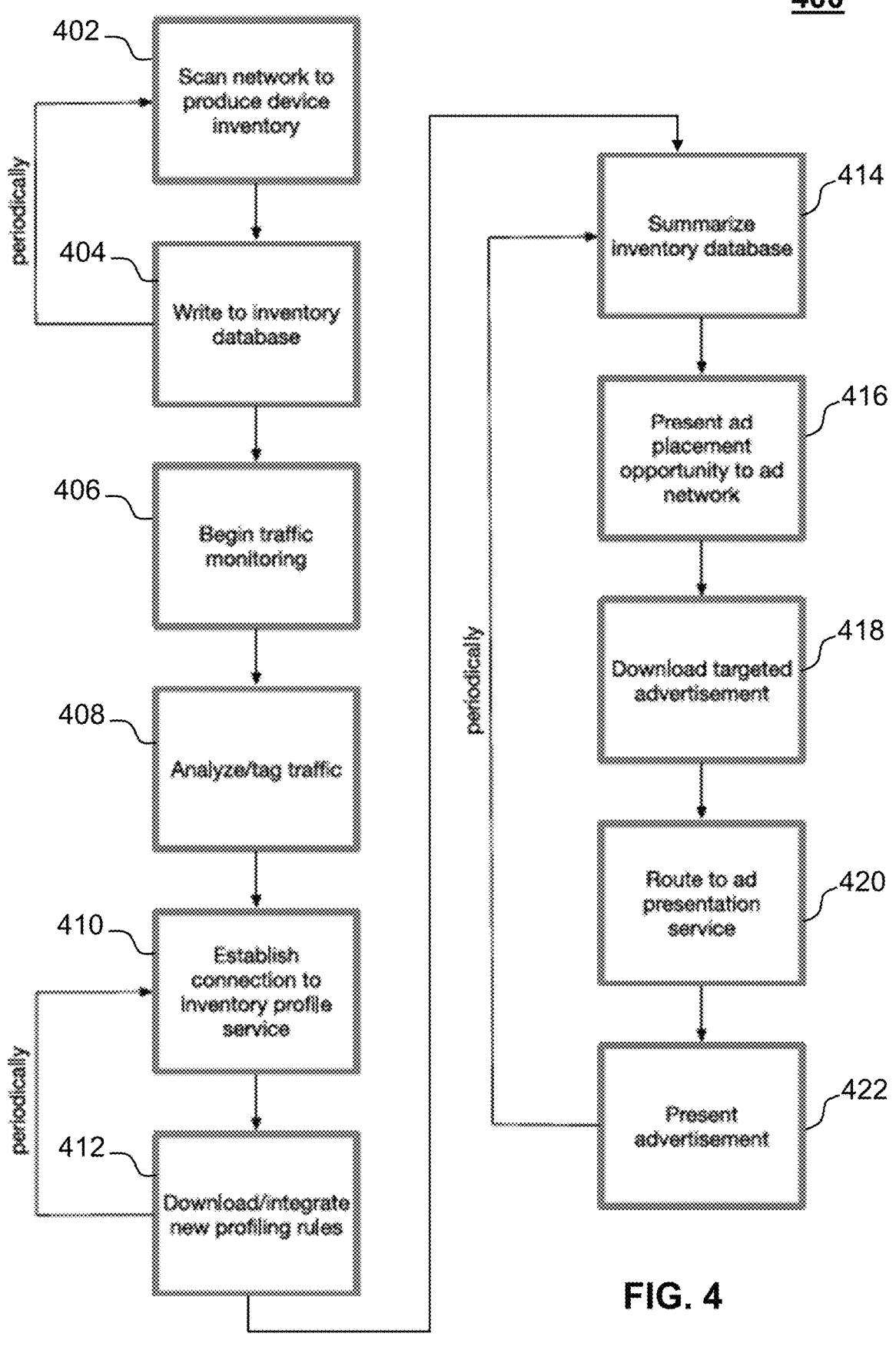
FIG. 4 depicts a flowchart of an exemplary process for providing personalized advertisements based on static and dynamic data of a private network, in accordance with some embodiments of the disclosure.

FIG. 4 depicts a flowchart of an exemplary process for providing personalized advertisements based on static and dynamic data of a private network, in accordance with some embodiments of the disclosure. Some embodiments may utilize a Network Inventory Service to perform one or more parts of process 400, e.g., as part of a network application stored and executed by one or more of the processors and memory of a device and/or server such as those depicted in FIGS. 6 and 7.

At step 402, the NIS scans a network to produce a device inventory. For instance, in scenario 100A of FIG. 1A, NIS 104, of device 102, may scan private network 120 and identify devices 121-128 on the network.

At step 404, the NIS writes captured data, e.g., regarding a device inventory, to the inventory database. For example, in scenario 100A, NIS 104 may generate and/or update device inventory database 106. A device inventory may be stored in a table such as, e.g., at least one of table 210 and table 230 of FIG. 2. An NIS may scan a network for inventory and write to an inventory database periodically.

At step 406, the NIS begins traffic monitoring. For instance, in FIG. 1A, NIS 104 may generate and/or update dynamic traffic data 108. Monitored traffic may be stored in a table such as table 250 of FIG. 2, as well as table entries 350 and 351 in FIGS. 3A and 3B, respectively.

At step 408, the NIS analyzes and/or tags traffic data. In some embodiments, the NIS may identify characteristics and/or categories of traffic flow data. For instance, table 250 of FIG. 2 includes, e.g., service category 256, service characterization 258, and sub-characterization 260.

At step 410, the NIS establishes a connection to the inventory profile service (IPS). For instance, in FIGS. 1A and 1B, NIS 104 may connect with IPS 140. At step 412, the NIS downloads and/or integrates new profiling rules from the IPS. An NIS and IPS may connect and download new rules periodically. At step 414, the NIS summarizes the captured data stored in the inventory database. In some embodiments, an NIS may incorporate an inventory database. In some embodiments, an NIS may connect to an external inventory database. For instance, in FIG. 1B, NIS 104 may summarize data from inventory database 105. An NIS may summarize an inventory database periodically.

At step 416, the NIS identifies and/or presents an advertising placement opportunity (e.g., an advertising avail) to an advertising network. In some embodiments, the NIS works in conjunction with an advertising presentation service, e.g., APS 130 of FIG. 1A. At step 418, the NIS downloads a targeted advertisement as directed by the advertising network. At step 420, the NIS routes the targeted advertisement to the ad presentation service. At step 422, the NIS causes the ad presentation service to present the downloaded advertisement.

Figure 5A:
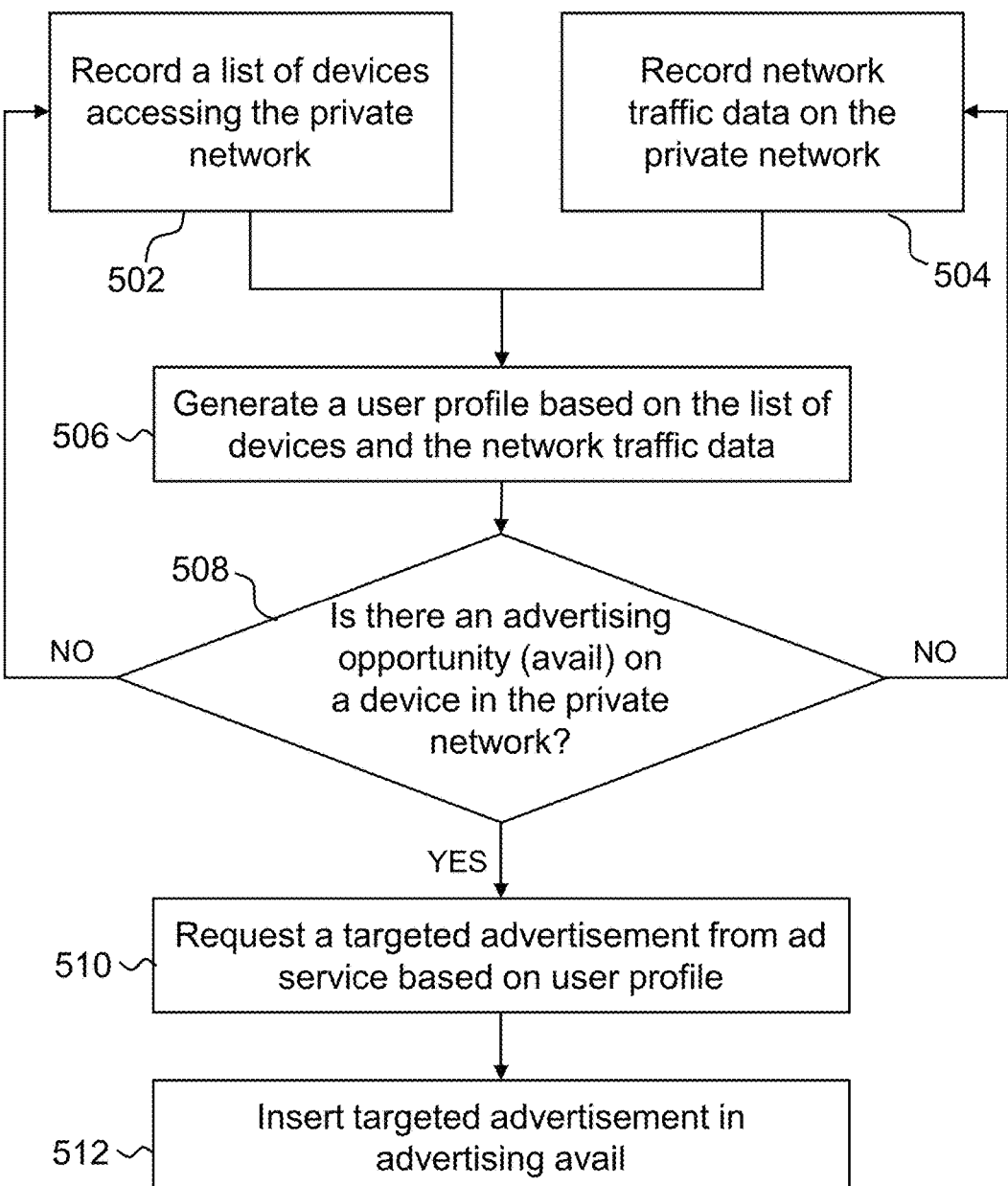
FIG. 5A depicts a flowchart of an exemplary process for providing personalized advertisements based on static and dynamic data of a private network, in accordance with some embodiments of the disclosure.

FIG. 5A depicts a flowchart of an exemplary process for providing personalized advertisements based on static and dynamic data of a private network, in accordance with some embodiments of the disclosure. Some embodiments may utilize an NIS to perform one or more parts of process 500, e.g., as part of a network application stored and executed by one or more of the processors and memory of a device and/or server such as those depicted in FIGS. 6 and 7.

At step 502, the NIS records a list of devices accessing the private network. At step 504, the NIS records network traffic data on the private network. At step 506, the NIS generates a user profile based on the list of devices and the network traffic data. In some embodiments, the NIS may update a user profile based on the list of devices and the network traffic data.

At step 508, the NIS determines whether there an advertising opportunity (avail) on a device in the private network. If, at step 508, the NIS determines there is no advertising avail on any device in the private network, then the process starts over, and the NIS updates the list of devices accessing the private network at step 502 and/or updates the record of network traffic data on the private network at step 504.

If, at step 508, the NIS determines there is an advertising avail on a device in the private network, then, at step 510, the NIS triggers a request for a targeted advertisement from an ad service based on the user profile. At step 512, the NIS causes the targeted advertisement to be inserted into the advertising avail.

Figure 5B:
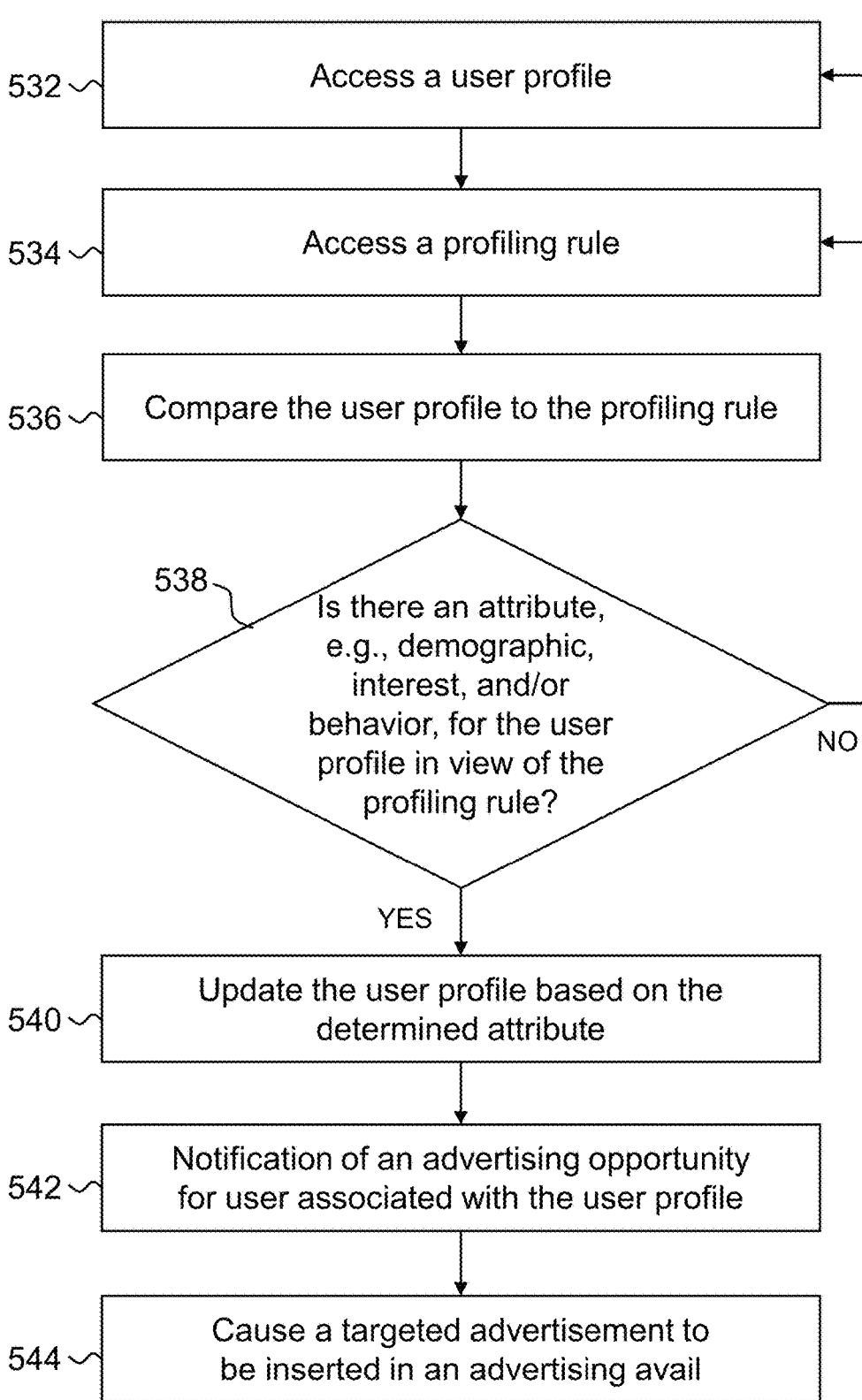
FIG. 5B depicts a flowchart of an exemplary process for personalizing advertisements based on static and dynamic data of a private network, in accordance with some embodiments of the disclosure.

FIG. 5B depicts a flowchart of an exemplary process for personalizing advertisements based on static and dynamic data of a private network, in accordance with some embodiments of the disclosure. Some embodiments may utilize an NIS, e.g., in conjunction with an advertising presentation service (APS), to perform one or more parts of process 530, e.g., as part of a network application stored and executed by one or more of the processors and memory of a device and/or server such as those depicted in FIGS. 6 and 7.

At step 532, a user profile is accessed. At step 534, the NIS accesses a profiling rule. For instance, the rule might be based on network packet loss, such as in FIG. 1A. In some embodiments, the rule might be based on certain content, e.g., watching "Game of Thrones" in FIG. 3A and/or playing "Assassin's Creed" in FIG. 3B. At step 536, the NIS compares the user profile to the profiling rule. For instance, at least a portion of the user profile may be compared to at least one profiling rule.

At step 538, the NIS determines whether there is an attribute, e.g., a demographic, an interest, a behavior, and/or another attribute, determined for the user profile in view of the profiling rule. For instance, the comparison of the at least a portion of the user profile and the at least one profiling rule may yield one or more attributes for the profile, e.g., based in demographics, interests, behaviors, and/or other attributes.

If, at step 538, the NIS determines there is no advertising avail on any device in the private network, then the process starts over, e.g., at step 532. In some embodiments, an updated user profile, e.g., with updated static and/or dynamic network data, may be accessed at step 532. In some embodiments, a different user profile may be accessed at step 532. In some embodiments, a different profiling rule may be accessed at step 534.

If, at step 538, the NIS determines there is an attribute, e.g., a demographic, an interest, a behavior, and/or another attribute, determined for the user profile in view of the profiling rule, then, at step 540, the NIS updates the user profile based on the determined attribute. At step 542, the NIS may be notified of an advertising opportunity, e.g., on a device used by the user associated with the user profile. In some embodiments, the NIS may be notified of a typical ad avail and recognize this traditional advertising avail as an opportunity to insert a highly personalized advertisement, e.g., based on private network data. In some embodiments, the NIS may be notified of an event (e.g., beginning of streaming, a network slowdown, etc.) and recognize the event as an opportunity to place a highly personalized advertisement based on private network data. For example, a rule may be in place that when a categorized binge-watcher is streaming Sci-Fi action on the private network, and they experience packet loss above 25%, a quick banner and/or overlay offering a new router may be presented, e.g., during playback and/or pause. With the profile information and the identified advertising avail, the NIS may trigger a request for a targeted advertisement from ad service to fill the avail, e.g., based on the determined attributes of the user profile. At step 542, the NIS causes the targeted advertisement to be inserted into an advertising avail.

Figure 5C:
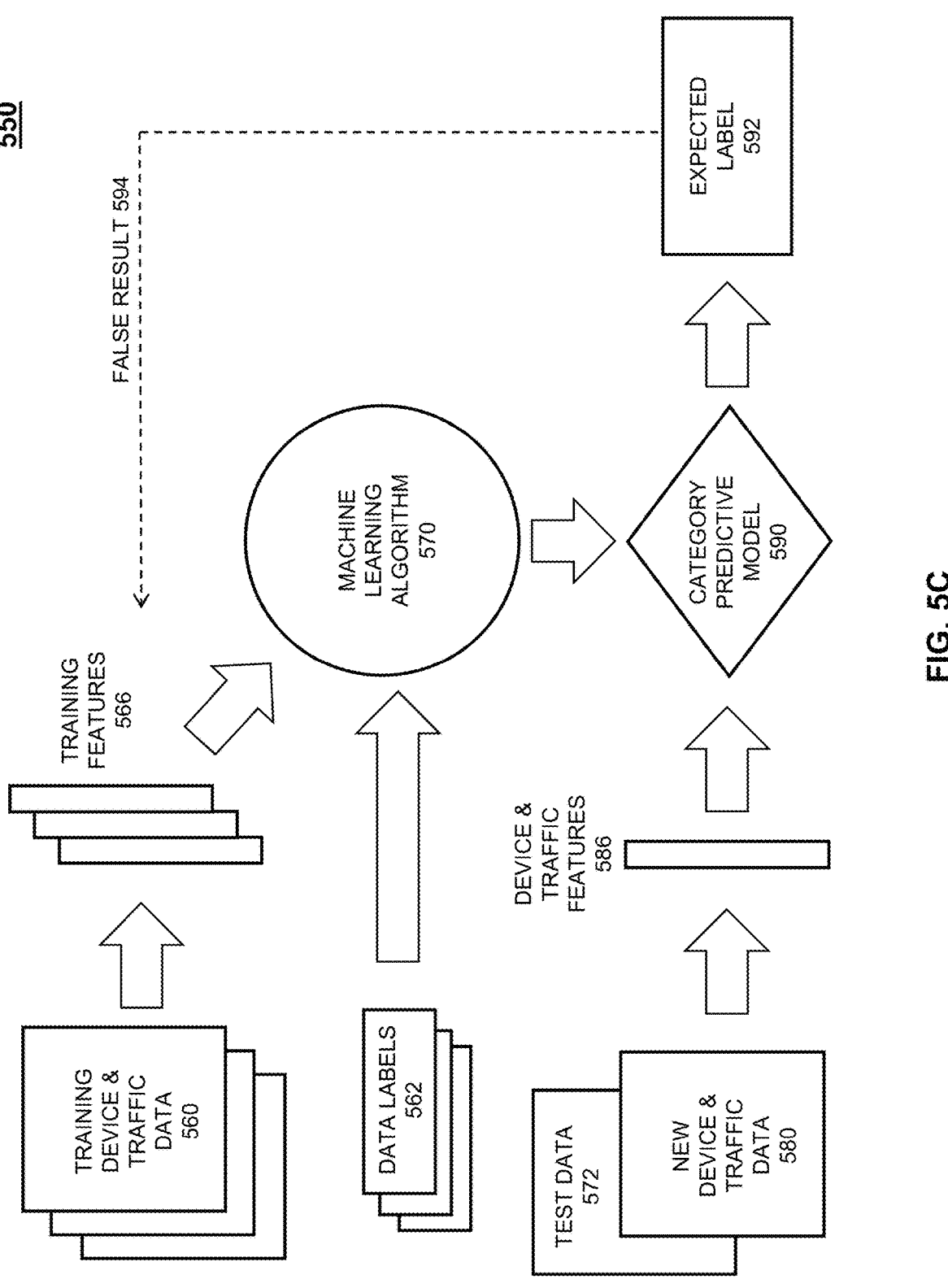
FIG. 5C depicts an illustrative flow diagram of a process for training a machine learning model to categorize private network data, in accordance with some embodiments of the disclosure.

FIG. 5C depicts an illustrative flow diagram of a process for training a machine learning model to determine transition scenes, in accordance with some embodiments of the disclosure. In some embodiments, categorizing device and traffic data of a home network may be accomplished with predictive modeling. For instance, a trained neural network may be used to classify device and traffic data for a private network as a category for personalized advertisements. Generally, a training set comprising dynamic traffic data and static device data may be used by a neural network to cluster and/or predict categories to be used for targeting advertising, e.g., based on demographics, interests, and/or behaviors. In some embodiments, a neural network trained to cluster and/or categorize device and traffic data, e.g., input from a private network, may be a part of an inventory profile service (IPS) and used to develop and store profile rules. In some embodiments, an IPS neural network may function as profile rules in classifying, categorizing, and/or otherwise determining appropriate advertising characteristics for a particular user, household, and/or device(s) on a private network.

Training a neural network to accurately cluster and/or predict categories may be accomplished in many ways. Some embodiments may use supervised learning where, e.g., a training data set includes labels identifying categories, e.g., based on demographics, interests, and/or behaviors. Some embodiments may use unsupervised learning that may identify target categories by clustering similar data. Some embodiments may use semi-supervised learning where a portion of labeled device and traffic data may be combined with unlabeled device and traffic data during training. In some embodiments, a reinforcement learning technique may be used. With reinforcement learning, a predictive model is trained from a series of actions by maximizing a "reward function," via rewarding correct labeling and penalizing improper labeling. Scenario 550 includes data labels 562, indicating a supervised or semi-supervised learning situation. A trained neural network may return a category label describing the input device and traffic data or may simply cluster the input device and traffic data with similar dynamic/static network data inputs.

Scenario 550 depicts training device and traffic data 560 along with data labels 562. Training data for device and traffic data clustering and categorizing may be collected by manually labeling training device and traffic data that indicate certain categories. In some embodiments, device and traffic data may comprise characteristics, categories, and/or sub-categories. Device and traffic data without classifications, e.g., from a control group, may also be captured and used. In some circumstances, an analyst may mark incoming device and traffic data with a label of a category or characteristic, e.g., in near real time, to create the training data set. From the device and traffic data collected, at least two groups of data may be created: training device and traffic data 560 and test data 572.

In scenario 550, training device and traffic data 560 is pre-processed using feature extraction to form training device and traffic data features 566. Pre-processing of training data is used to obtain proper data for training.

After pre-processing, training features 566 are fed into Machine Learning Algorithm (MLA) 590 to generate an initial machine learning model, e.g., category predictive model 1540. In some embodiments, MLA 570 uses numbers between 0 and 1 to determine whether the provided data, e.g., training features 566, fits a certain category or not. The more data that is provided, the more accurate MLA 570 will be in creating a model, e.g., category predictive model 590.

Once MLA 570 creates category predictive model 590, test data 572 may be fed into the model to verify the system and test how accurately model 590 behaves. In some embodiments, test data 572 is pre-processed to become device and traffic features 586 and passed to category predictive model 590 for a predictive classification. Category predictive model 590 labels the input test data with a classification. In some embodiments, each iteration of test data 572 is classified and reviewed for accuracy. For example, if expected label 592 is not correct, false result 594 may be fed as learning data back into MLA 570. If, after test data 572 is classified and reviewed, model 590 does not perform as expected (e.g., with a goal of an error rate below 5%) then additional training data may be provided until the model meets the expected criteria. In some embodiments, a reinforcement learning method may be incorporated with test data to reward or punish MLA 570.

Once category predictive model 590 works as expected, new real-time device and traffic data may be fed to the model, and determinations of a category or classification may be predicted with confidence. For instance, in scenario 550, new device and traffic data 580 may be pre-processed to be a device and/or traffic feature 586 and passed to category predictive model 590 for a prediction. Category predictive model 590 may evaluate device and traffic feature 586 and present a categorization for the data. If new device and traffic data can be verified outside the system, model 590 may be further updated with feedback and reinforcement for further accuracy.

In some embodiments, category predictive model 590 may be trained to label subcategorizations in a similar manner. In some cases, subcategorizations labeling may be performed instead of categorization labeling. For example, some embodiments of a predictive model may label content by subcategories instead of categories and then categorize each subcategorization under one of several categories.

Figure 6:
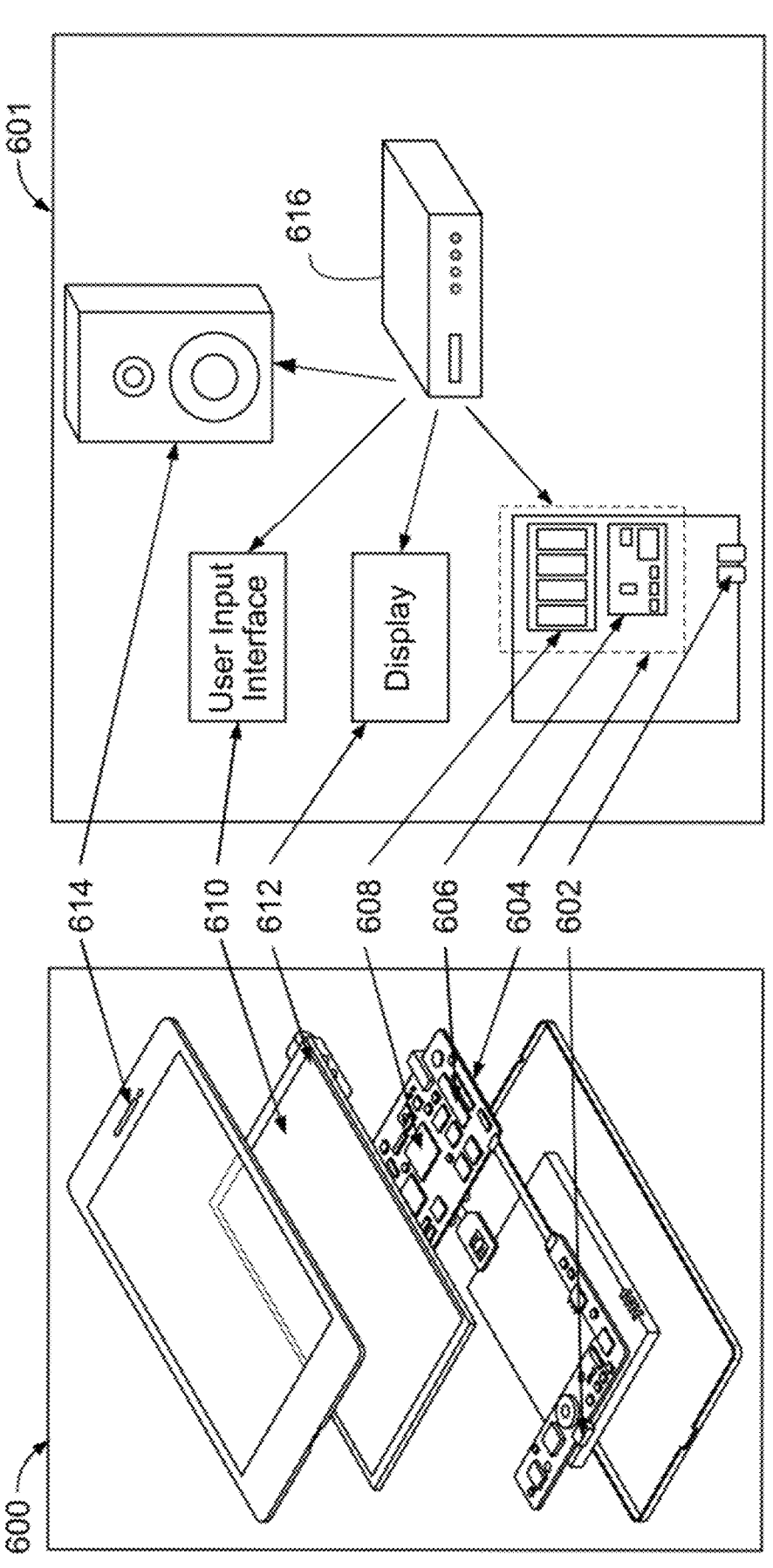
FIG. 6 is a diagram of illustrative devices, in accordance with some embodiments of the disclosure.

FIG. 6 is a diagram of illustrative devices, in accordance with some embodiments of the disclosure. Device 600 may be implemented by a device or system, e.g., a device providing a display to a user, or any other suitable control circuitry configured to generate a display to a user of content. For example, device 600 of FIG. 6 can be implemented as equipment 601. In some embodiments, equipment 601 may include set-top box 616 that includes, or is communicatively coupled to, display 612, audio equipment 614 (e.g., speakers or headphones), microphone 616, camera 618, and user input interface 610. In some embodiments, display 612 may include a television display or a computer display. In some embodiments, user interface input 610 is a remote-control device. Set-top box 616 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of device 600 and equipment 601 may receive content and receive data via input/output (hereinafter "I/O") path 602. I/O path 602 may provide content and receive data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communication paths (described below). I/O functions may be provided by one or more of these communication paths but are shown as a single path in FIG. 6 to avoid overcomplicating the drawing. While set-top box 616 is shown in FIG. 6 for illustration, any suitable computing device having processing circuitry, control circuitry, and storage may be used in accordance with the present disclosure. For example, set-top box 616 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for an application NIS stored in memory (e.g., storage 608). Specifically, control circuitry 604 may be instructed by the application to perform the functions discussed above and below. For example, the application may provide instructions to control circuitry 604 to determine screen positions. In some implementations, any action performed by control circuitry 604 may be based on instructions received from the application.

In some client/server-based embodiments, control circuitry 604 includes communications circuitry suitable for communicating with an application server. An NIS may be a stand-alone application implemented on a device or a server. An NIS may be implemented as software or a set of executable instructions. The instructions for performing any of the embodiments discussed herein of the NIS may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 6, the instructions may be stored in storage 608, and executed by control circuitry 604 of a device 600.

In some embodiments, an NIS may be a client/server application where only the client application resides on device 600 (e.g., devices 702A-F), and a server application resides on an external server (e.g., server 706). For example, an NIS may be implemented partially as a client application on control circuitry 604 of device 600 and partially on server 706 as a server application running on control circuitry. Server 706 may be a part of a local area network with one or more of devices 702A-F or may be part of a cloud computing environment accessed via the internet. In a cloud computing environment, various types of computing services for performing searches on the internet or informational databases, providing storage (e.g., for a database or scoring table) or parsing data are provided by a collection of network-accessible computing and storage resources (e.g., server 706), referred to as "the cloud." Device 600 may be a cloud client that relies on the cloud computing capabilities from server 706 to determine network devices and/or traffic or provide personalized advertisements. When executed by control circuitry of server 706, the NIS may instruct the control circuitry to generate the NIS output (e.g., device/traffic data and/or personalized advertisements) and transmit the generated output to one or more of devices 702A-F. The client application may instruct control circuitry of the receiving device 702A-F to generate the NIS output. Alternatively, one or more of devices 702A-F may perform all computations locally via control circuitry 604 without relying on server 706.

Control circuitry 604 may include communications circuitry suitable for communicating with an NIS server, a table or database server, or other networks or servers. The instructions for carrying out the above-mentioned functionality may be stored and executed on the application server 706. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device such as storage 608, which is part of control circuitry 604. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 608 may be used to store various types of content described herein as well as content guidance data described above. Nonvolatile memory may also be used (e.g., to launch a boot-up routine and other instructions). Cloud-based storage, for example, (e.g., on server 706) may be used to supplement storage 608 or instead of storage 608.

A user may send instructions to control circuitry 604 using user input interface 610. User input interface 610 and display 612 may be any suitable interface such as a touchscreen, touchpad, or stylus and/or may be responsive to external device add-ons, such as a remote control, mouse, trackball, keypad, keyboard, joystick, voice recognition interface, or other user input interfaces. Display 612 may include a touchscreen configured to provide a display and receive haptic input. For example, the touchscreen may be configured to receive haptic input from a finger, a stylus, or both. In some embodiments, equipment device 600 may include a front-facing screen and a rear-facing screen, multiple front screens, or multiple angled screens. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 616.

Audio equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio equipment 614 may be provided as integrated with other elements of each one of device 600 and equipment 601 or may be stand-alone units. An audio component of videos and other content displayed on display 612 may be played through speakers (or headphones) of audio equipment 614. In some embodiments, audio may be distributed to a receiver (not shown), which processes and outputs the audio via speakers of audio equipment 614. In some embodiments, for example, control circuitry 604 is configured to provide audio cues to a user, or other audio feedback to a user, using speakers of audio equipment 614. There may be a separate microphone 616 or audio equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

An application (e.g., for generating a display) may be implemented using any suitable architecture. For example, a stand-alone application may be wholly implemented on each one of device 600 and equipment 601. In some such embodiments, instructions of the application are stored locally (e.g., in storage 608), and data for use by the application is downloaded on a periodic basis (e.g., from an out-of-band feed, from an internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, participation data from a participant profile. In some embodiments, control circuitry 604 may calculate several scores, such as a readiness score, based on profile data. Control circuitry 604 may store scores in a database and the database may be linked to a user profile. Additionally, control circuitry 604 may obtain all or part of other user profiles that are related to a particular user (e.g., via social media networks), and/or obtain information about the user from other sources that control circuitry 604 may access. As a result, a user can be provided with a unified experience across different devices.

In some embodiments, the application is a client/server-based application. Data for use by a thick or thin client implemented on each one of device 600 and equipment 601 is retrieved on demand by issuing requests to a server remote from each one of device 600 and equipment 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to device 600 for presentation to the user.

Figure 7:
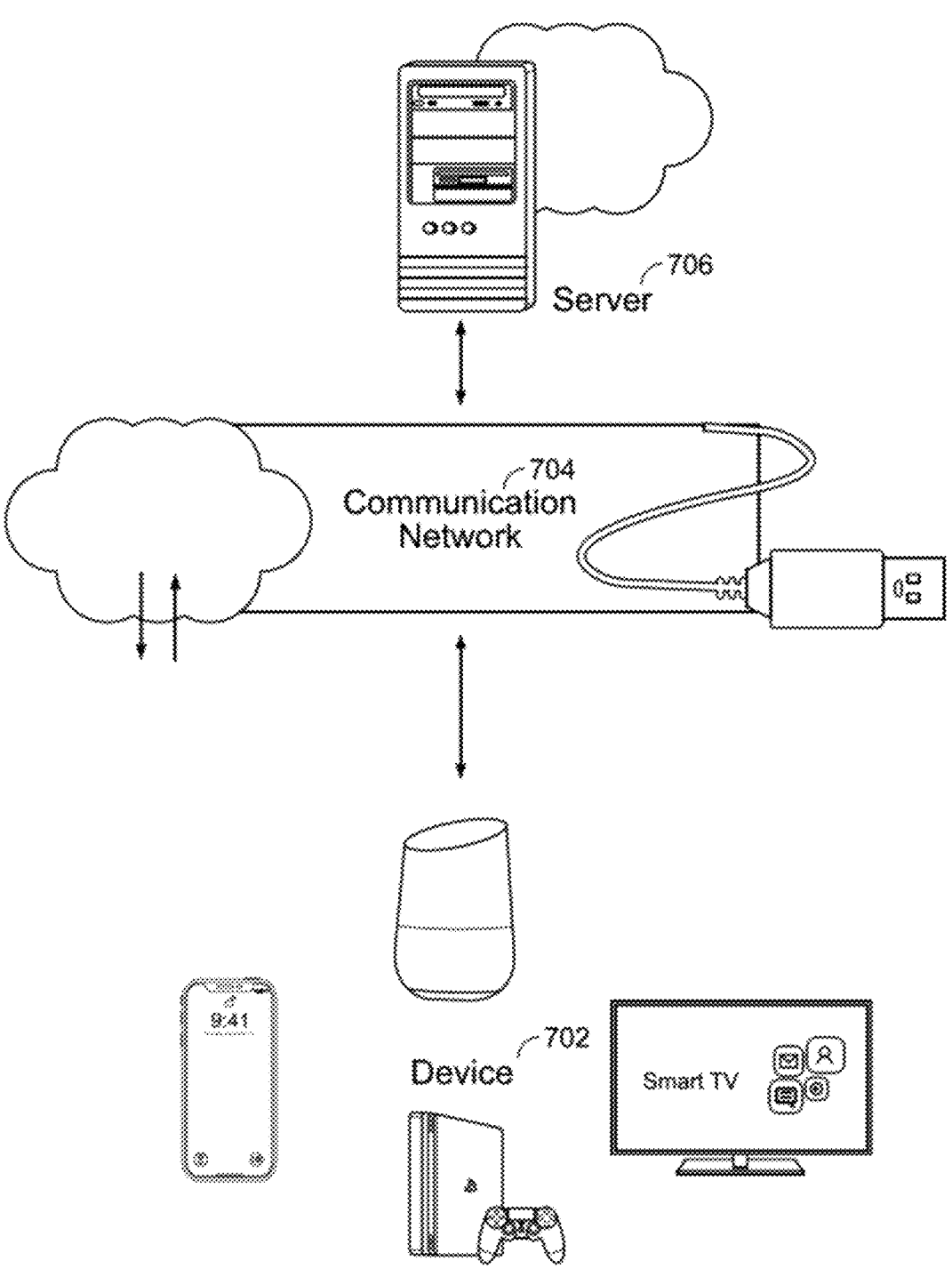
FIG. 7 is a diagram of an illustrative system, in accordance with some embodiments of the disclosure.

As depicted in FIG. 7, one or more of devices 702A-F may be coupled to communication network 704. Communication network 704 may be one or more networks including the internet, a mobile phone network, mobile voice or data network (e.g., a 5G or 4G or LTE network), cable network, public switched telephone network, Bluetooth, or other types of communication network or combinations of communication networks. Thus, devices 702A-F may communicate with server 706 over communication network 704 via communications circuitry described above. In should be noted that there may be more than one server 706, but only one is shown in FIG. 7 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communication path or combination of such paths.

In some embodiments, the application is downloaded and interpreted or otherwise run by an interpreter or virtual machine (e.g., run by control circuitry 604). In some embodiments, the application may be encoded in the ETV Binary Interchange Format (EBIF), received by control circuitry 604 as part of a suitable feed, and interpreted by a user agent running on control circuitry 604. For example, the application may be an EBIF application. In some embodiments, the application may be defined by a series of JAVA-based files that are received and run by a local virtual machine or other suitable middleware executed by control circuitry 604.

The systems and processes discussed above are intended to be illustrative and not limiting. Although example embodiments are described above, the various features and steps may be combined, divided, omitted, and/or augmented in any desired manner, depending on the specific outcome and/or application. One skilled in the art would appreciate that the actions of the processes discussed herein may be omitted, modified, combined, and/or rearranged, and any additional actions may be performed without departing from the scope of the invention. Various alterations, modifications, and improvements will readily occur to those skilled in art. Such alterations, modifications, and improvements as are made obvious by this disclosure are intended to be part of this description though not expressly stated herein and are intended to be within the spirit and scope of the disclosure . . . . Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. The foregoing description is by way of example only, and not limiting. This patent is limited only as defined in the following claims and equivalents thereto.

What is claimed is:

1. A method comprising:
   recording, by a second device within a private network, private network data for at least one device of a plurality of devices connected to the private network, wherein the private network data is not accessible outside of the private network;
   identifying an advertising avail for a first device of the plurality of devices;
   accessing, via the second device within the private network, a user profile associated with the first device wherein the user profile comprises at least a portion of the recorded private network data of the private network;
   requesting, from an advertising service outside of the private network, an advertisement wherein the advertisement is selected by the advertising service based at least in part on the private network data of the user profile provided via the second device within the private network;
   receiving, by the first device, from the advertising service outside of the private network, the advertisement; and
   causing the advertisement to be inserted in the advertising avail for the first device.

2. The method of claim 1, wherein the private network data of the private network comprises data describing the plurality of devices connected to the private network.

3. The method of claim 1, wherein the second device is a network inventory service (NIS) device.

4. The method of claim 3, further comprising:
   generating, by the second device, the user profile by:
      accessing, by the second device from an inventory profile service (IPS), a profiling rule;
      determining, by the second device and based on the profiling rule, a recorded list of the plurality of devices, and the private network data, an attribute related to a demographic, an interest, or a behavior; and
      updating, by the second device, the user profile based on the determined attribute.

5. The method of claim 3, wherein the second device monitors, for each device of the plurality of devices, at least one selected from the group consisting of private IP address, MAC address, port status, active services, operating system, hardware properties, or software properties.

6. The method of claim 3, wherein the second device within the private network monitors, for each device of the plurality of devices, one or more of the following:
   destination address for packets, data speed, Wi-Fi link quality, traffic between devices on the network, or traffic between local devices and external devices.

7. The method of claim 1, wherein the advertising avail comprises an advertising opportunity based on the respective private network data for the first device.

8. The method of claim 1, wherein the requesting, from the advertising service outside of the private network, the advertisement comprises a request for a targeted advertisement.

9. The method of claim 1, wherein the providing, at the first device, the advertisement based at least in part on the advertising avail comprises:
   causing the advertisement to be inserted in the advertising avail for the first device; and
   generating for display, at the first device, the advertisement.

10. A system comprising:
   memory;
   control circuitry configured to:
      record private network data for at least one device of a plurality of devices connected to the private network, wherein the private network data is not accessible outside of the private network;
      identify an advertising avail for a first device of the plurality of devices;
      access, from the memory, a user profile associated with the first device wherein the user profile comprises at least a portion of the recorded private network data of the private network;
      request, from an advertising service outside of the private network, an advertisement wherein the advertisement is selected by the advertising service based at least in part on the respective private network data of the user profile; and
      receive from the advertising service outside of the private network, the advertisement; and
      cause the advertisement to be inserted in the advertising avail for the first device.

11. The system of claim 10, wherein the private network data of the private network comprises data describing the plurality of devices connected to the private network.

12. The system of claim 10, wherein the control circuitry is part of a network inventory service (NIS) device.

13. The system of claim 12, wherein the control circuitry is further configured to:

generate, by the NIS device, the user profile by:

accessing, from an inventory profile service (IPS), a profiling rule;

determining, based on the profiling rule, a recorded list of the plurality of devices, and the private network data, an attribute related to a demographic, an interest, or a behavior; and updating the user profile based on the determined attribute.

14. The system of claim 12, wherein the control circuitry is further configured to monitor, for each device of the plurality of devices, at least one selected from the group consisting of private IP address, MAC address, port status, active services, operating system, hardware properties, or software properties.

15. The system of claim 12, wherein the control circuitry is further configured to monitor, for each device of the plurality of devices within the private network, one or more of the following:

destination address for packets, data speed, Wi-Fi link quality, traffic between devices on the network, or traffic between local devices and external devices.

16. The system of claim 10, wherein the advertising avail comprises an advertising opportunity based on the respective private network data for the first device.

17. The system of claim 10, wherein the request, from the advertising service outside of the private network, for the advertisement comprises a request for a targeted advertisement.

18. The system of claim 10, wherein the control circuitry is further configured to provide, at the first device, the advertisement based at least in part on the advertising avail by:

causing the advertisement to be inserted in the advertising avail for the first device; and generating for display, at the first device, the advertisement.

19. A method comprising:

recording, by a network inventory service (NIS) device within a private network, private network data for at least one device of a plurality of devices connected to the private network, wherein the private network data is not accessible outside of the private network;

identifying an advertising avail for a first device of the plurality of devices;

accessing, via the NIS device within the private network, a user profile associated with the first device wherein the user profile comprises at least a portion of the recorded private network data of the private network;

requesting, from an advertising service outside of the private network, an advertisement wherein the advertisement is selected by the advertising service based at least in part on the respective private network data of the user profile provided via the NIS device within the private network;

receiving, by the first device, from the advertising service outside of the private network, the advertisement; and causing the advertisement to be inserted in the advertising avail for the first device.

* * * * *